US007287738B2

(12) United States Patent
Pitlor

(10) Patent No.: US 7,287,738 B2
(45) Date of Patent: *Oct. 30, 2007

(54) REMOTELY ATTACHABLE AND SEPARABLE COUPLING

(75) Inventor: Nelson Douglas Pitlor, Twinsburg, OH (US)

(73) Assignee: Accessmount LLC, Twinsburg, OH (US)

( * ) Notice: Subject to any disclaimer, the term of this patent is extended or adjusted under 35 U.S.C. 154(b) by 344 days.

This patent is subject to a terminal disclaimer.

(21) Appl. No.: 10/007,509

(22) Filed: Dec. 5, 2001

(65) Prior Publication Data

US 2002/0079412 A1 Jun. 27, 2002

Related U.S. Application Data

(63) Continuation-in-part of application No. 09/730,920, filed on Dec. 6, 2000, now Pat. No. 6,644,617.

(51) Int. Cl.
*F16M 13/00* (2006.01)
(52) U.S. Cl. .............. 248/544; 248/206.5; 248/309.4; 248/205.4; 248/683; 248/342; 248/343; 248/344; 248/317; 248/318; 340/693.11; 340/693.6; 340/693.9; 340/628; 340/629; 294/19.1; 361/331; 361/380; 361/392; 361/600; 361/679; 361/807; 361/809; 361/825
(58) Field of Classification Search .......... 248/206.5, 248/309.4, 683, 317, 339, 544, 342, 343, 248/344, 318; 340/628, 693.11, 693.9, 693.6, 340/629; 362/390, 147, 398; 16/110.1; 81/53.1, 176.15; 294/19.1; 361/331, 380, 361/392, 600, 679, 807, 809, 825
See application file for complete search history.

(56) References Cited

U.S. PATENT DOCUMENTS

| | | | | |
|---|---|---|---|---|
| 3,593,021 A | * | 7/1971 | Auerbach | 240/128 |
| 3,836,766 A | * | 9/1974 | Auerbach | 240/73 D |
| 4,058,357 A | | 11/1977 | Wallace | |
| 4,074,341 A | * | 2/1978 | Niederost et al. | 361/600 |
| 4,162,779 A | * | 7/1979 | Van Steenhoven et al. | 248/343 |

(Continued)

OTHER PUBLICATIONS

System Sensor, "XR-5 Detector Installation/Removal Tool for Use With System Sensor Plug-In Detectors,", pp. 1-2, date unknown.

(Continued)

*Primary Examiner*—Carl D. Friedman
*Assistant Examiner*—Todd M. Epps
(74) *Attorney, Agent, or Firm*—Renner, Otto, Boisselle & Sklar, LLP

(57) ABSTRACT

An article for mounting from or against the ceiling is removably coupled to a base fixedly secured to the ceiling, by a person standing on the floor, supporting the article on an elongated rod, and thrusting the article against the base to couple the article and the secured base. The article is removed by inserting the rod into the article, exerting a force on the rod to uncouple the article from the base, and supporting the article on the rod as the article is lowered. The article is thus positioned on or hung from the ceiling, without being manually contacted by the person. The article may be used to mount other devices, such as a sign, smoke detector, etc. or may include such device as a part of the mount.

29 Claims, 18 Drawing Sheets

U.S. PATENT DOCUMENTS

| | | | | |
|---|---|---|---|---|
| 4,422,137 | A | * | 12/1983 | Watts .......................... 362/390 |
| 4,538,214 | A | | 8/1985 | Fisher et al. |
| 4,719,549 | A | | 1/1988 | Apel |
| 4,911,396 | A | | 3/1990 | Polonsky |
| 4,982,581 | A | | 1/1991 | Furuyama |
| 4,998,814 | A | * | 3/1991 | Perry .......................... 359/871 |
| 5,149,038 | A | | 9/1992 | VanCleve |
| 5,154,509 | A | | 10/1992 | Wulfman et al. |
| 5,178,453 | A | | 1/1993 | Runels |
| D345,028 | S | | 3/1994 | Alvarez Baranga |
| 5,382,167 | A | | 1/1995 | Janson, Jr. |
| 5,401,175 | A | | 3/1995 | Guimond et al. |
| 5,457,614 | A | | 10/1995 | Duty |
| 5,457,619 | A | | 10/1995 | Ewing |
| 5,472,163 | A | | 12/1995 | Callas |
| 5,478,256 | A | | 12/1995 | Koganemaru et al. |
| D369,781 | S | | 5/1996 | Schadhauser |
| 5,563,766 | A | | 10/1996 | Long et al. |
| 5,577,696 | A | | 11/1996 | Kramer |
| 5,609,317 | A | | 3/1997 | Glynn et al. |
| 5,617,079 | A | | 4/1997 | Harrison |
| 5,708,874 | A | | 1/1998 | Schrock et al. |
| 5,725,190 | A | * | 3/1998 | Cuthbertson et al. ....... 248/343 |
| 5,782,445 | A | | 7/1998 | Cleek |
| 5,793,295 | A | | 8/1998 | Goldstein |
| 5,803,751 | A | | 9/1998 | Liu |
| 5,938,255 | A | * | 8/1999 | Rose et al. ................. 294/19.1 |
| 5,967,640 | A | | 10/1999 | Moriyama et al. |
| 6,042,080 | A | | 3/2000 | Shepherd et al. |
| 6,048,010 | A | * | 4/2000 | Stocker ..................... 294/19.1 |
| 6,095,660 | A | | 8/2000 | Moriyama et al. |
| 6,181,251 | B1 | * | 1/2001 | Kelly .......................... 340/628 |
| 6,433,700 | B1 | * | 8/2002 | Malewski et al. ..... 340/693.11 |
| 6,591,716 | B2 | * | 7/2003 | Wantz .......................... 81/53.1 |
| 6,644,617 | B2 | * | 11/2003 | Pitlor .......................... 248/544 |
| 6,859,146 | B2 | * | 2/2005 | McGreal et al. ......... 340/693.6 |

OTHER PUBLICATIONS

Hochiki America Corporatioin, "NSRT-A100 / NSTT-A100 Smoke Detector Removal Tool / Tester", 2 pages, date unknown.

International Search Report regarding International Application No. PCT/US01/47179 dated May 12, 2001.

* cited by examiner

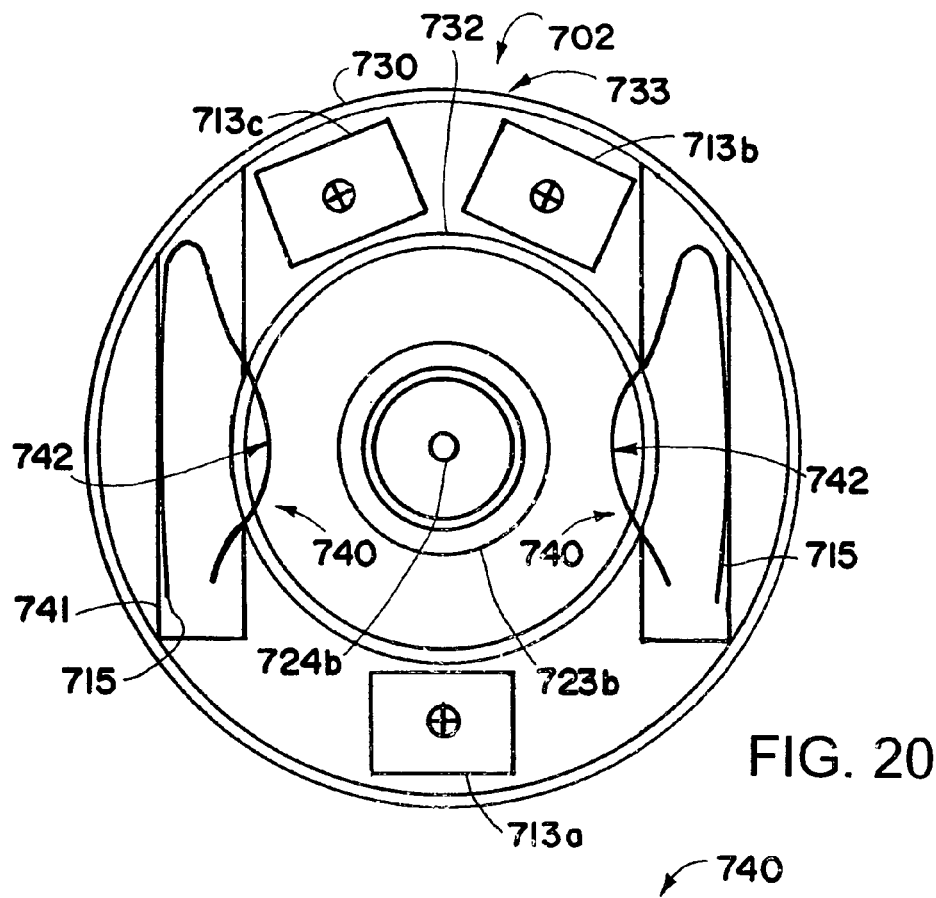
FIG. 20
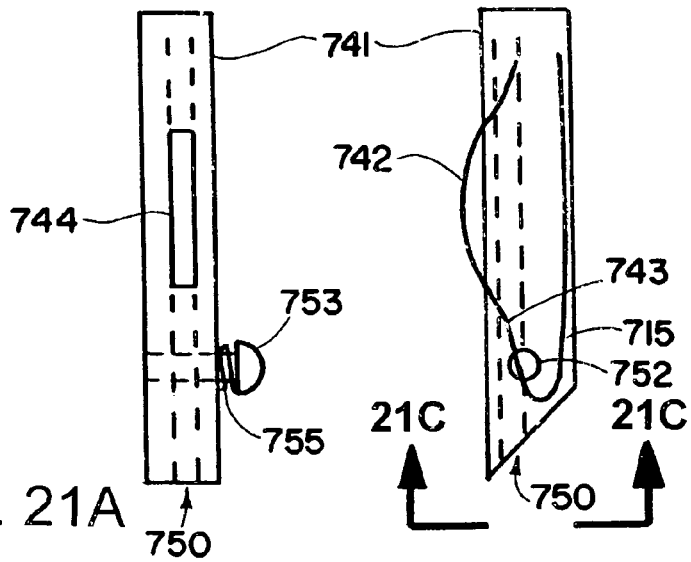
FIG. 21A
FIG. 21B
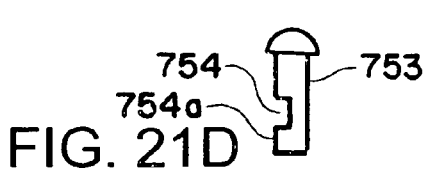
FIG. 21D
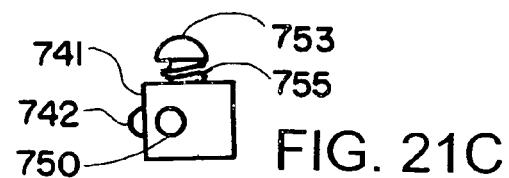
FIG. 21C

REMOTELY ATTACHABLE AND SEPARABLE COUPLING

TECHNICAL FIELD

The present invention relates to an improvement in access means for an assembly located on a room's ceiling or other overhead location, by a human manipulating the assembly while standing on the room's floor; seated in a wheelchair, or otherwise unable to reach the assembly unassisted. The primary purpose of the assembly is to suspend an article, such as a sign, or, pendently support a device, such as a smoke detector and alarm or other electrically actuated fixture, which, of necessity, is to be secured to the ceiling, and periodically removed for renewal, maintenance or inspection. The assembly of the invention also may be used to mount or to support various devices from a wall, ceiling, pole, or virtually any other member, part or the like; and/or the assembly may be included as part of such device.

BACKGROUND

Magnetic holders such as are disclosed in U.S. Pat. No. 5,472,163 to Callas are used to display signs on upright metal supports. A permanent magnet is wedged between a pair of metal plates and enclosed within a shell shaped to provide horizontal stability and a strong holding force on the support. An upright cylindrical adaptor attached to the top of the shell is used to accommodate the shaft of the sign.

The problem to be solved herein is different from that addressed in the '163 patent. This invention is directed to a problem that is encountered when dealing with an article suspended, or to be suspended from a ceiling, or other overhead location, in typical everyday situations. The problem: how does a person locate and manually secure an article on a high, out-of-reach ceiling or other overhead location without using something to stand on, for example, a step-ladder. Thereafter, how does the person remove the article when required to do so, again without resorting to climbing onto a surface higher than the floor, since the overhead location is well out of reach of the person's upwardly outstretched hand, as the ceiling usually is? Such a ceiling, referred to herein as a "high" ceiling may be in the range from about 8 feet (2.44 meters) to about 30 feet (9.14 m) high.

One aspect of the novel assembly disclosed herein comprises two separate parts, one of which, a first part, is secured to the ceiling, wall, or other overhead location, usually out of reach location; the other, second part, may be secured to the article, or, may be the article itself, adapted to be releasably coupled internally with the first part, that is, coupled with coupling means within the body of the first part. Components of the assembly are adapted to removably secure an article to the high location with a manually manipulated elongated tool or rod, referred to herein as a "rod" for brevity, thus avoiding using a step-ladder, the effort of hauling the stepladder underneath the assembly, and the risk of injury posed by having to deal with the assembly on the high location while standing on the step-ladder.

Merchandise such as toys, garments, groceries, hardware, lumber, and office supplies, is commonly advertised within a store by signs hanging from the store's ceiling. Such signs may serve to direct a customer to a particular product, for example, bread in a grocery store; or the sign may serve to advertise a "special" on a particular item. Because the locations of goods in a store are frequently changed, as is the "special" offered from week to week, the location of the signs, as well as the signs themselves, must also be correspondingly changed. This is typically a time-consuming effort usually carried out after a store is closed for the day, and requires that an employee drag a step-ladder from one sign to the next one which is to be changed, or to use a motorized scissor-jack to travel from one to the other and change it. With the advent of stores which are open round the clock (the "24 hr. store") signs must be changed during a time when there are the fewest customers on the premises, if only to avoid risk of injury to them.

In numerous celebratory situations, congratulatory signs, streamers and balloons are hung from the ceiling, usually tied to a pendent fixture such as a hanging light or ceiling fan. Restaurants and hotels have "party rooms" dedicated to celebrations, and such a room's ceiling is sometimes provided with hooks, the same color as the ceiling, which are unobtrusively screwed into the ceiling. The hooks are used to suspend balloons and streamers, which are required to be changed for each occasion, entailing a substantial amount of time-consuming labor. The simple task of inserting a hook into the eye of an eye-bolt on the ceiling, or snagging a hook on the ceiling with another hook from which a bunch of balloons is hung, while standing on a step-ladder is a trying and time-consuming task. It would be far less expensive and more efficient to be able to change the pendent decorations without having to mount a stepladder for each decoration to be changed.

Another article suspended from a ceiling, which is required to be reached relatively frequently, is a battery-operated (or battery backed) smoke detector and alarm ("smoke alarm"), the battery for which must be changed when its charge is depleted. As anyone who has replaced batteries in a smoke alarm secured to the ceiling is well aware, enthusiasm for changing the battery, immediately upon noting that it must be changed, is inhibited, and the task is complicated, by having to climb onto a step-ladder while removing and replacing the battery with outstretched arms. Typically, the battery is to be inserted in a tightly-fitting harness in the body of the smoke alarm. To ease the task, and allow a person to change the battery with less stress on his arms, U.S. Pat. No. 5,577,696 to Kramer discloses a steel base plate which is fastened to the ceiling; a magnet is held in a receiver secured to the smoke alarm, so that when the magnet is placed on the steel base plate, the smoke alarm is held on the ceiling. When the battery is to be changed, the magnetic coupling allows one to remove the smoke alarm from the base plate, but one has to stand on a stepladder to do so. The difficulty of registering a steel plate to a magnet secured to the ceiling is minimal so long as the task is addressed by a person on a stepladder and the magnet is conveniently within the reach of the person's arm. The difficulty of the simple task is greatly exaggerated if the steel plate is to be registered to the magnet on a ceiling which cannot be reached with a conveniently available step-ladder, the higher the ceiling, the more daunting the task, and certainly impossible if the person is in a wheelchair. It is only retrospectively self-evident that it is far more convenient and much safer, to remove the smoke alarm without having to use the stepladder, if only the solution to the problem was readily at hand.

For example, two parts of a novel assembly of the invention may comprise subassemblies only one of which is removable from the ceiling by being manually couplable and decouplable while standing on the floor of the room, using a broom stick or other elongated rod, easily manipulated with purposeful accuracy and little force, by that person.

SUMMARY OF THE INVENTION

An assembly adapted to be secured to a ceiling or other overhead location comprises a pair of first and second subassemblies couplable and decouplable by a person standing on the floor, without manually directly contacting either, but using a rod or other elongated member. The first subassembly may be fixedly secured to the ceiling or other overhead location, hence referred to as the secured subassembly, or "base member" or "base" for brevity; the second subassembly, which provides a surface to which an article is secured, for example a hook or an electrical fixture, is removably coupled to the base; because the second subassembly is used to mount the article which is to be suspended, or, is itself provided by the base of the article to be suspended, the second assembly is referred to as the suspended subassembly, or "mounting member" or "mount" for brevity. The two subassemblies, namely, the base and mount, are coupled to one another with remotely uncouplable coupling means, for example, magnetically, or, with mating hooks and eyelets such as are provided with Velcro® fasteners adhesively secured within the base and mount respectively, or, by a detent means integrally formed with the base and mount, such as a peripheral detent, or, a latching means, or, an interference fit. A rod-acceptance means, such as a socket, or finger-like protrusion, or through-passage in the mount, also functions as a detachment means, depending upon whether the mount is to be positioned on the base, or removed from it; when the rod-acceptance means is a rod-attachment means, it is secured to the mount, or may be integrally formed therewith, and is adapted to be interfitted to one end of a rod so as to be securely supported by it. When a force is exerted on the rod by a person manipulating it from the floor of the room, the mount is easily engaged with, or disengaged from the base, the mechanical advantage arising from the use of a long rod as a lever. The dimensions of the mount may be so chosen that it be mated to the base with effortless accuracy; a decoupling force adequate to disengage the mount from the base is exerted on the end of the rod to remove the mount after it is mated. The decoupling force required to decouple the subassemblies depends upon the coupling force exerted by the coupling means, and the decoupling force exerted is increased by the length of the rod which provides the leverage.

In a first embodiment, the base and mount are magnetically couplable, then decoupled when required, by a person on the floor of a room.

In a second embodiment, the base and mount are couplable with mating hooks and eyelets such as are provided with Velcro® fasteners.

In a third embodiment, the base and mount are couplable with interfitting detent means.

In a fourth embodiment, the base and mount are couplable with a latching means.

In a fifth embodiment, an assembly secured in position as exemplified in one of the foregoing four specific embodiments is provided with at least two electrical contacts in electrical connection with wires in the ceiling; an electrical fixture secured to the mount is electrically connected to the wires in the ceiling when the subassemblies are coupled; and when they are decoupled, the electrical connection is broken.

In a sixth embodiment, the component-mounting floor of a smoke detector and alarm assembly, or light fixture, by itself, is coupled with magnetic coupling means, directly to a base member secured to the ceiling; electrical components which actuate the detector and alarm, or light fixture, and a replaceable battery are mounted on the component-mounting floor of the detector and alarm which is covered with a removable cover; rod-attachment means are provided integrally with the cover.

Another aspect of the invention relates to a fixture mounting structure, including a base mountable securely to a support (e.g., a wall, ceiling, pole); a cover attachable to the base; a magnetic device to hold (or to secure or to retain) the cover and base together; and a selectively operable mechanical retainer to provide retention of the cover to the base.

Another aspect relates to a fixture installation and removal tool including a base, a rod attachment mechanism integrally formed within the base; and a coupling mechanism extending from the base at an angle to the rod attachment mechanism.

Another aspect relates to a fixture mounting system including a first relatively fixed part having a retention mechanism, a second part relatively movable with respect to the first part and attachable with respect thereto, a tool for temporarily coupling with respect to the second part to position the second part with respect to and for retention to the first part, and a latch to retain the tool and second part together, the latch being releasable upon positioning of the second part with respect to the first part.

Another aspect relates to a latch for a mounting system and related tool wherein one member may be mounted with respect to a mount by manipulating the one member using the tool, the latch including a selectively operable retainer to retain a coupled relation of the one member and tool, and a release responsive to mounting of one member to facilitate separating the one member from the tool.

Another aspect of the invention relates to a latch mechanism for a mounting system in which one member is to be mounted with respect to a mount, including a tool for manipulating the one member with respect to the mount, a selectively operable retainer to retain a coupled relationship between the tool and the one member, and a release mechanism to release the retainer to facilitate separating the tool and the one member in response to mounting the one member with respect to mount.

Another aspect relates to a mounting system, including first and second parts, the first part adapted for support from another object, the second part adapted to support a device, and a holding mechanism to hold said first and second parts together, said holding mechanism including a first magnetic retainer and a mechanically actuable retainer.

Another aspect relates to a retention system for plural members, including a magnetic retainer for holding one such member relative to another such member, and a selectively operable mechanical retainer for holding such one member and such another member together.

Another aspect relates to a mounting system for mounting an object from another member, including a first member attachable to a support, a second member selectively attachable to and removable from the first member, a first magnetic attachment having a first portion associated with the first member and a second portion associated with the second member, the portions being cooperative with each other to retain the first and second members together, and a first selectively operable attachment having a first portion associated with the first member and a second portion associated with the second member.

Another aspect relates to a coupling method for plural members, wherein one member has associated with it at least one part of a magnetic retainer and another member has associated with it at least a second part of such magnetic retainer, including placing such one and another members in proximity for the magnetic retainer to hold them together; and using a mechanical retainer to retain together such one and another members.

Another aspect relates to a mounting system for an electrical device, which has electrical connection requirements, including a base mountable to another device and having first and second electrical terminals connectible to an electrical power source, a cover attachable to the base and having third and fourth electrical terminals, the first and third electrical terminals generally circumscribing an area surrounding a respective second and fourth electrical terminal; at least one of the first and third electrical terminals being operable to deform resiliently in response to urging by the other of the first and third electrical terminals as the base and cover are urged together.

Another aspect relates to a mounting structure including a base mountable securely to a support; a cover attachable to the base; and a selectively operable mechanical retainer to provide retention of the cover to the base, wherein the selectively operable mechanical retainer is a touch latch.

Another aspect relates to a fixture mounting structure, including a base mountable securely to a support; a cover attachable to the base; and a selectively operable mechanical retainer to provide retention of the cover to the base, wherein the selectively operable mechanical retainer is a slam latch.

BRIEF DESCRIPTION OF THE DRAWING

The foregoing and additional objects and advantages of the invention will best be understood by reference to the following detailed description, accompanied with schematic illustrations of several embodiments of the invention, in which illustrations like reference numerals refer to like elements, and in which:

FIG. 20 is a top view, partly broken away to show the respective clips of the mount of the system of FIG. 17.

FIG. 21A is a fragmentary elevation view of the clip holder and clip slot of the mount of the system of FIG. 17.

FIG. 21B is a fragmentary elevation section view of the clip holder, clip slot and clip of the mount of the system of FIG. 17.

FIG. 21C is a fragmentary front view of the clip holder with a locking pin looking generally in the direction of the arrows 21C-21C of FIG. 21B.

FIG. 21D is an elevation view of a locking pin.

DESCRIPTION

Figure 1:
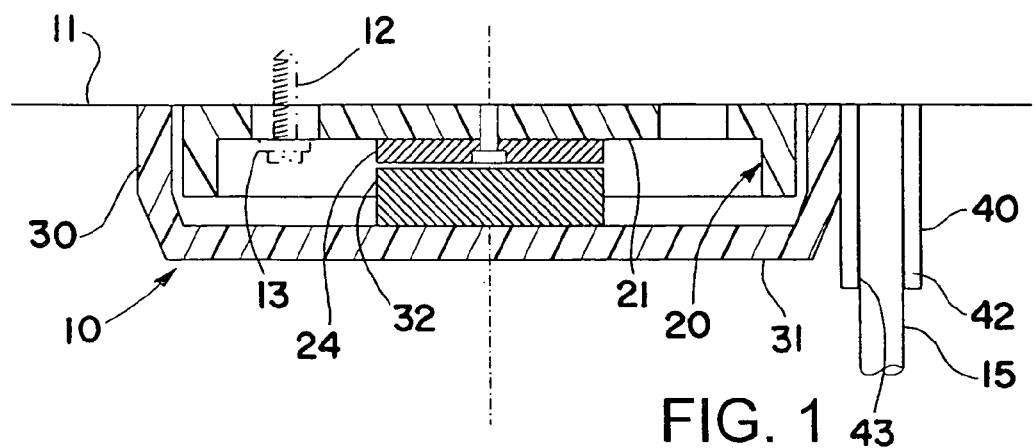
FIG. 1 is a cross-sectional side elevation view of assembled first (base) and second (mount) subassemblies, the base being secured to a ceiling, and the mount magnetically held against the base which is received within the mount.

In some cases in the past, a relatively heavy article would not be removably suspended with manually decouplable coupling means because of the relatively high manual force (greater than 1 lb) required to disengage the article. Such force would have to be applied while standing on a step-ladder or other elevating means which permitted a person to reach the article. The higher the force required, the greater the risk of falling off the step-ladder. In an embodiment of this invention, a relatively small force, easily applied on the rod with one hand, will angulate the centerline of the suspended subassembly relative to the first (fixed base) sufficiently to allow the suspended subassembly to be angularly disengaged, even if the magnet means, Velcro® fasteners or other coupling means exerted a force of about 10 kg (22 lb). Though articles heavier than about 1 kg (2.2 lb) are easily and safely suspended with the suspended subassembly of this invention, much heavier articles, heavier than about 10 kg (22 lb) are not suited to be suspended by a single suspended subassembly as the danger of losing control of fitting and removing the suspended subassembly on the end of a rod presents a risk of injury to a person who loses control. When such heavier objects are required to be suspended with a single assembly, that assembly may comprise plural coupling means appropriately located between the base and the mount; each of the coupling means, e.g. a magnet or Velcro® fasteners, exerting a force in the range from about 0.45 kg (1 lb) to about 4.5 kg (10 lb) force. Where objects heavier than about 1 kg (2.2 lb) are suspended with a magnet, the cost of the magnet and the ferrous plate are the major portion of the cost of the assembly; therefore it is desirable to use the magnet most efficiently, that is, utilize all its strength. It will be appreciated by those having ordinary skill in the art that weights and capacities expressed are only exemplary and can be other than those described while still embodying the invention.

To register the couplable components, e.g. the magnet means with its ferrous metal counterpart, irrespective of which couplable component is secured to the base or the mount, or pair of magnets, the suspended subassembly is advanced upward to the secured subassembly so as to permit coupling them. The couplable components may be at least one magnet and a ferrous metal; and they may be registered with mating dish-shaped members one of which houses the magnet(s), the other housing the ferrous metal. The rod-acceptance means may be a rod-attachment means such as a socket or finger-like protrusion, rather than a through-passage in the mount, for reasons set forth herebelow. The end of the rod supports and balances the mount as it is raised to the base. The rod-attachment means may be a socket. The socket may be integrally formed with the mount, and the end of the rod may be is biased against the closed end of the socket by gravity, or may be threadedly engaged therein. After the mount is coupled to the base, the end of the rod is removed from the mount. The mount may be serviced by inserting the end of the rod into the rod-acceptance means, exerting sufficient force to decouple the mount from the base, supporting the mount on the end of the rod and lowering the mount to allow it to be removed from the end of the rod.

The secured first subassembly or "base member" may be of a standard, circular configuration, providing a dish-shaped base (disc-shape base, or some other appropriate shape base); the suspended second subassembly or "mount" may be of any arbitrary configuration, and each differently configured mount is interchangeably couplable to the base member; for example, a configuration of the suspended subassembly may include a box-shaped mount, the mount having an overall rectangular shape and planar floor; a hook is secured to hang from the lower surface of the floor; two or more spaced-apart hooks may be provided to support a sign which is required to be hung from plural hooks; another mount may include a cup-shaped configuration and a planar, circular lower surface which may be used to mount a smoke alarm. In each case the base member may include a peripheral downward-extending wall and the mount typically provides a generally planar base, or a dish- or cup-shaped member having a generally planar floor with an outwardly flaring peripheral wall to allow the peripheral wall of the dish-shaped base member to be received when the mount is couple to the base member.

In an embodiment the base member and mount are couplable and decouplable without manually touching either, though which subassembly holds the magnet, as long as one is fixed, is not critical. By "without manually touching" is meant that there is no contact of the subassemblies with a person's hand during installation or removal of the mount. In an embodiment the magnet coupling means is held in mating dish-shaped base and mount members so as to facilitate aligning the magnet and the ferrous metal. The peripheral walls of the subassemblies may be dimensioned such that the entire surface of the one or more magnets used is covered by the ferrous plate to make economic use of the full strength of the magnet.

Figure 2:
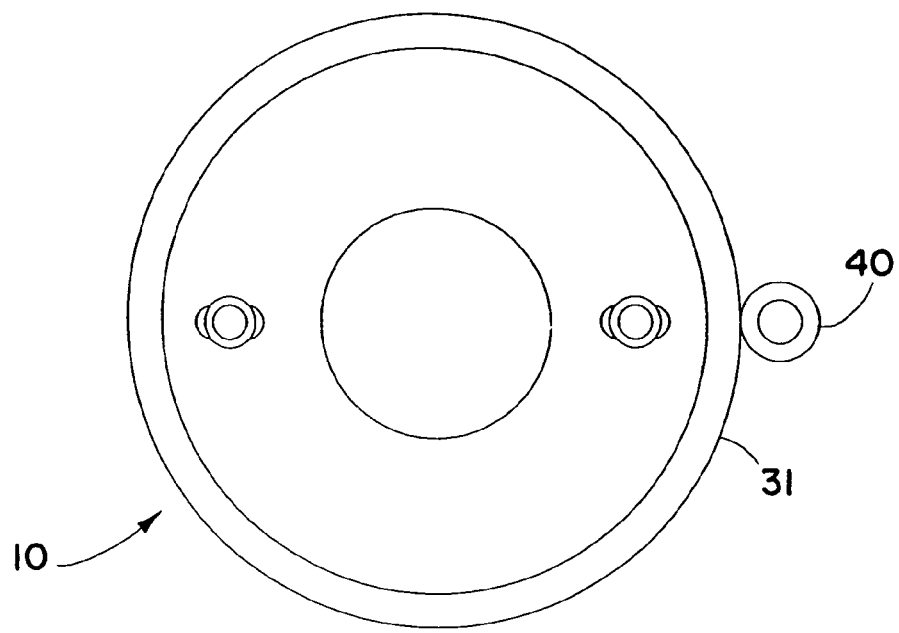
FIG. 2 is a bottom plan view, that is, viewed from beneath, of the assembled base and mount shown in FIG. 1.

It will be recognized that some residential ceilings may be no more than 2.44 meters (8 feet) from the floor of a room but in numerous instances even residential ceilings may be 9.14 meters (10 feet) or more, and ceilings in commercial salesrooms and warehouses are even higher, typically in the range from 4.57 meters (15 ft) to 9.14 meters (30 ft). The higher the ceiling the more difficult it is to manipulate anything on the ceiling from the floor. Therefore, as is illustrated in FIGS. 1 and 2, first (base member) and second (mount) subassemblies 20 and 30 respectively are matingly disposed against the ceiling 11. Though the shapes of the base member and mount are not necessarily interrelated and may be arbitrary as long as the shapes allow the coupling means to be engaged and disengaged when desired, it is convenient to use a generally circular base and mount for ease of assembly and accurate registration of coupling means.

The base 20 may include a first synthetic resinous cup-shaped dish 21 ("first dish 21" for brevity) which is secured to the ceiling 11 with suitable fastening means, for example a pair of oppositely spaced apart screws 12 inserted through washers 13. The mount 30 comprises a second synthetic resinous cup-shaped dish 31 ("second dish 31") which is shown matingly coupled in male-female relationship with the first dish 21. Centrally located in the first dish 21 is a magnet 24 (see FIG. 3) and a plate of ferrous material 32, for example steel, is located centrally within the second dish 31, corresponding to the magnet 24, so that the surfaces of the magnet and steel plate will be in tight contact when the first and second dishes are mated.

It will be evident that when the coupling means is magnetic, the material from which the second dish 31 and the first dish 21 are formed is non-magnetic, and, for example, may be poly(vinyl chloride), styrene or a phenol-formaldehyde resin, though aluminum would be suitable. The second dish 31 is mated to the first dish 21 by holding the former on the end of a rod 15, so that the magnet 24 is fully covered by plate 32, as shown in FIG. 2. On the end of a long rod, the second dish 31 is more easily slid over the circular periphery of the first dish 21 than if the peripheries of each was other than circular. For example with a rectangular first dish and a correspondingly rectangular second dish, the corners of each may be accurately matched before the two can be mated; elliptical shapes are easier than rectangular but more difficult than circular.

Figure 3:
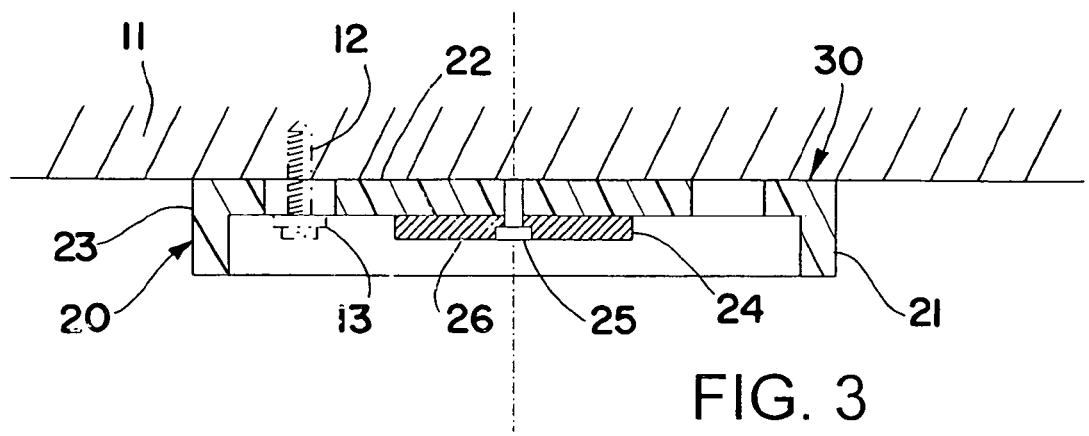
FIG. 3 is a cross-sectional side elevation view of the base secured to the ceiling.
Figure 4:
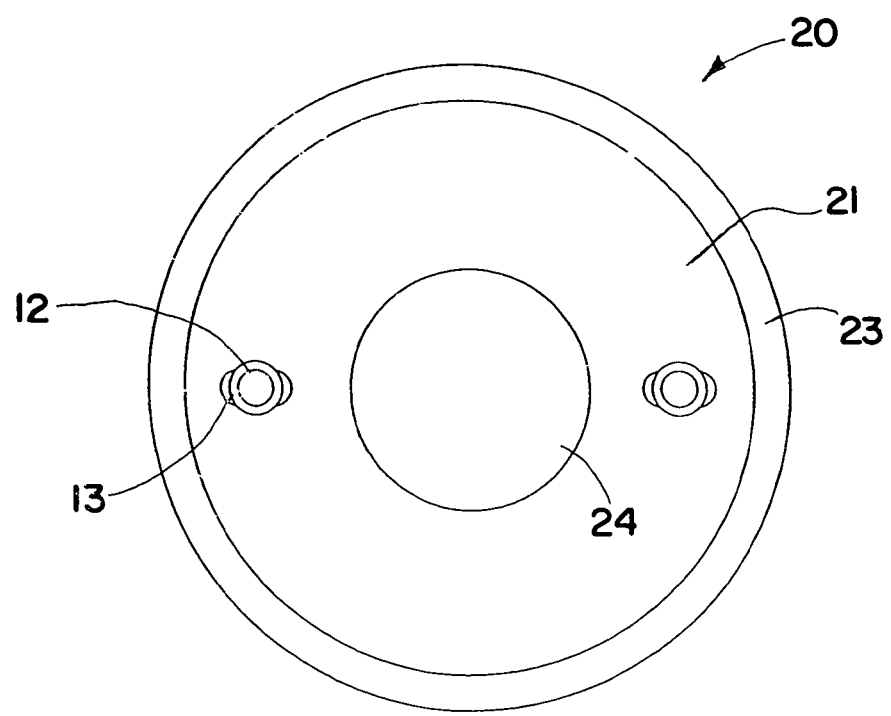
FIG. 4 is a bottom plan view, that is, viewed from beneath, of the base shown in FIGS. 1 and 2.

Referring to FIGS. 3 and 4, it is seen that the first dish 21 of the base 20 includes a planar disc 22 peripherally ringed by an integral cylindrical wall 23. Centrally secured to the lower surface of disc 22 is magnet 24, for example by a screw 25, the head of which is in a correspondingly shaped hollow countersunk in the lower face of the magnet so that it presents a planar lower surface against lower surface 26. The strength of the magnet 24 is chosen to correspond with the weight of the objects to be suspended, for example, in the range from 113.4 gm (0.25) lb to about 4.536 kg (10 lb). As will readily be apparent, the greater the weight to be suspended, the stronger the magnet required and the greater the force required to disengage a suspended mount which is magnetically coupled with the magnet. It will also be evident that the expense of the magnet will dictate that the assembly be designed to suspend a particular maximum load, and that the magnet's strength be optimally utilized. Such optimal use can result when the area of the magnet is fully covered by the ferrous counterpart (see FIGS. 1, 2 & 10).

Reverting to FIGS. 1 and 3, to ensure that the magnet 24 is fully covered by the ferrous plate 32, irrespective of where the magnet 24 is positioned on the planar disc 22 of the first dish 21, the area of the latter (plate 32) may be much larger than that of the magnet, and may occupy substantially the entire area of the floor 37 of the second subassembly. Of course such unnecessarily large area of the ferrous plate to compensate for inappropriately positioning the magnet is costly and wasteful; therefore, matching the area of the magnet 24 to an appropriate area of the plate 32 is to be ensured.

Figure 5:
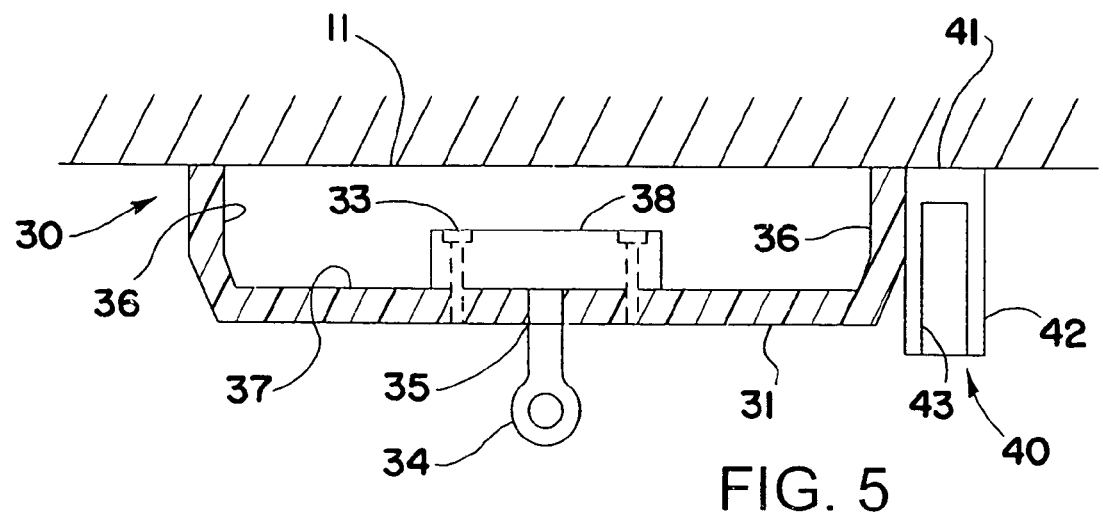
FIG. 5 is a cross-sectional side elevation view of the mount secured to the ceiling (the base is not shown).
Figure 6:
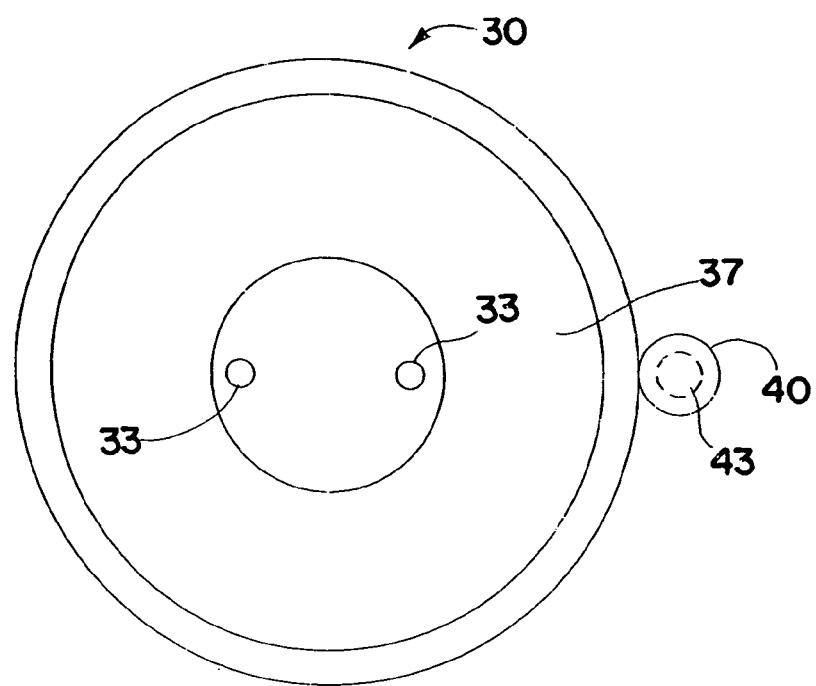
FIG. 6 is a bottom plan view, that is viewed from beneath, of the mount shown in FIG. 5.

Referring to FIGS. 5 and 6, the second subassembly or "mount" 30 includes second dish 31 and a tubular socket 40; the socket 40 has a closed end 41 and downwardly extending sidewalls 42 by which the socket is secured to the exterior periphery of the second dish 31. The socket 40 is secured so that its cavity 43 is directed substantially vertically downward and the closed end's planar base is substantially coplanarly disposed relative to the plane of the peripheral surface of the second dish 31. The cross-section of the cavity 43 is not critical, serving only to slidably accommodate the end of rod 15. Since a cylindrical rod such as a broom handle is typically conveniently at hand, the cavity is cylindrical in cross-section. The closed end of the socket 40 serves to support the mount on the end of the rod; however, if the socket is open-ended, that is, a hollow tubular section, the rod may nevertheless be angulated relative to the vertical, to remove the mount. A relatively close tolerance between rod and the walls of the socket or tube will permit the second subassembly to be lowered controllably.

A ferrous metal disc 38 is secured to the floor 37 of the second dish 31 with appropriate fastening means, for example, a pair of opposed spaced apart screws 33 the heads of which are countersunk in the planar surface of the disc 38 and threaded into the floor 37. The disc 38 is bored and threaded to receive a correspondingly threaded eye-bolt 34, which is inserted through a central aperture 35 in the floor 37, the eye-bolt in turn suspending a sign from a hook (not shown). When the hook is inserted into the eye of the eye-bolt an article, such as a sign, attached to the hood is suspended from the ceiling. Changing the sign is accomplished by removing and lowering the second dish 31 to the floor of the room, substituting the appropriate hook in the eye-bolt, inserting a rod 15 into the socket 40 and replacing the second dish 31 on the first dish 21.

The function of the second dish 31 is to provide a mount, and also to permit the first dish 21 to be guided into the second dish 31 so as to center the magnet 24 on the ferrous metal disc 38, and use the entire force exerted by the magnet. To facilitate inserting first dish 21 into second dish 31, the inside diameter of walls 36 of the second dish 31 is greater than the outside diameter of the first dish 21 so the walls 23 of the latter may be readily inserted into the former (second dish 31). To align the ferrous metal disc 38 and the magnet 24 more accurately, a downwardly tapered annular transition zone connecting the walls 36 to the floor 37 urges the periphery of the walls of the first dish 21 inward until, when the periphery of the walls of the first dish 21 abut the floor 37, the magnet 24 is centered upon the disc 38. By "downwardly tapered" is meant that the cross-section of the second dish 31 at its periphery is greater than the cross-section of the walls where they meet the floor 37. In an example, the inside diameter of the second dish 31 may be in the range from about 5% to about 10% greater than the outside diameter of the periphery of the first dish 21 to allow angulation of the second dish 31 relative to the first dish 21, as is explained below.

The socket 40 may have a smooth-walled interior, its diameter being slightly larger, from about 0.05% to 5%, than that of the rod 15, say a broom handle, to be inserted in the socket. Since the socket is smooth-walled, a directly downward pull on the rod will only serve to remove it from the socket. Therefore, a force is applied at the distal end (from the socket) in the lateral direction. This force serves to pivot the second dish 31 on the base of the socket 40, thus angulating the ferrous plate 32 relative to the lateral surface of the magnet 24. Such angulation, in the range from about 1° to about 15° is sufficient to break contact with one edge (the distal end from the socket) of the magnet and progressively disengages the remaining surface of the magnet, thus requiring only a fraction, from 50% to 10% or less than the large force required to break contact with the entire surface of the magnet, at one time, substantially instantaneously, which large force would be required if the mount 30 was to be pulled directly downward.

As will now readily be evident, if desired, a large directly downward force could be applied, if desired, by threading the interior wall of the socket cavity 43 and threadedly engaging the end of a rod having a correspondingly threaded end (see FIG. 16), if there is an over-riding reason to do so, since it is apparent that threading the rod into the socket requires additional effort which in most instances is not justified.

The first and second dishes 21 and 31 respectively may be injection molded, and whether the socket 40 has a smooth cavity or is threaded, the socket 40 may be integrally molded with the second dish 31. Moreover, where the configuration of the mount permits, the socket may be formed directly in the periphery of the second dish; or, a through-passage in the periphery of the second dish may afford sufficient purchase for the rod, as for example when the second dish supports a larger structure (see FIG. 8).

It will be appreciated that the height of the assembly 10, that is, the distance to which the assembly projects downward from the ceiling, may be kept to a minimum to keep the assembly as unobtrusive as possible. Therefore, though the overall dimensions of the assembly are not narrowly critical, for practical applications, the height of the first dish 21 is in the range from about 1 cm to about 4 cm, the height of the corresponding second dish 31 being greater by about the thickness of the floor 37. For most applications, the cross-section of wall 36 and floor 37 is in the range from about 1 mm to about 3 mm, as is the cross-sectional thickness of the first dish 21, the thickness in each case being sufficient to provide adequate rigidity and strength to the assembly, and related to the physical characteristics of the synthetic resin used.

Figure 7:
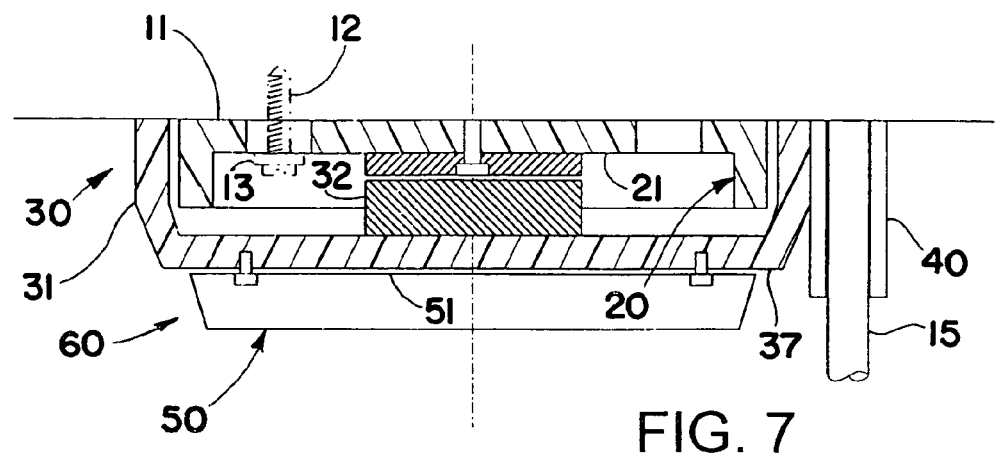
FIG. 7 is a side elevation cross-sectional view of a coupling, including a base to which is magnetically coupled a mount, to the lower surface of which, a smoke detector and alarm assembly ("smoke alarm") is secured.

Referring to FIG. 7 there is schematically illustrated an assembly 60 comprising a base 20, a mount 30, and a conventional smoke alarm 50 secured to the mount 30. Such a smoke alarm typically has a base plate 51 with a bayonet mount to secure it to a receiving base and the receiving base is secured to the ceiling. To suspend such a smoke alarm 50 from the ceiling, using assembly 10, the bayonet mount is dispensed with, and the smoke alarm is directly secured to the lower surface 37 of dish-shaped portion 31 of the mount. As before, mount 30 includes a rod-attachment means, shown as a socket, and a slight force exerted on the end of the rod, in a generally lateral direction, serves to disengage the steel disc 32 from the magnet 24. The smoke alarm 50 may then be conveniently serviced on a table in the room and replaced on the base 21 by reinserting the handle of the broom into the socket 40 and mating the second dish 31 to the first dish 21.

Figure 8:
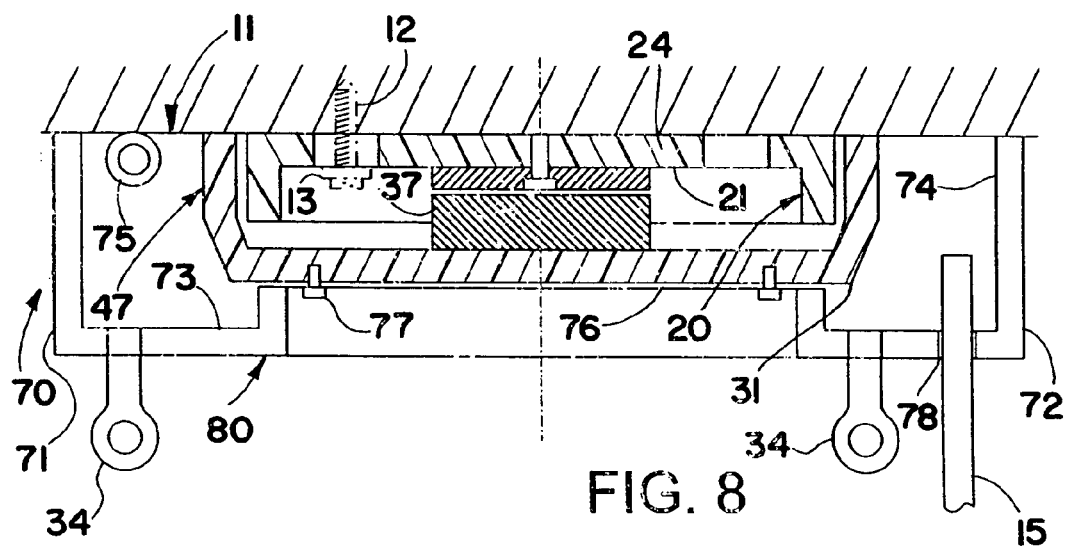
FIG. 8 is a side elevation cross-sectional view of a coupling, including a mount having a larger lower surface than that provided by the mount illustrated in FIG. 5.

Referring to FIG. 8 there is shown an assembly 80 in which the suspended subassembly 70 is the "mount" which includes a cup-shaped member 47 and a suspension member 71 attached to the lower surface of cup-shaped member 47. The suspension member 71 presents a larger lower surface than that presented by the cup-shaped member 71, the larger surface making it possible to provide plural spaced-apart eye-bolts 34 from which to hang an article (not shown). The shape of the suspension member is arbitrary, the one illustrated being provided to clear an adjacent obstruction such as a conduit 75 carried on the ceiling. As shown, the suspension member 71 is a generally rectangular dish 72 having an upwardly stepped floor 73 and vertical walls 74 which abut the ceiling to hide the conduit 75. The central portion 76 of the stepped floor is planar and secured to the lower surface of the second dish 31 with fastening means such as spaced-apart screws 77. A through passage 78 in the suspension member 71 near its periphery is large enough to have a rod 15 inserted in it. As before, a lateral force on the distal end of the rod angulates the steel disc 32 against the magnet 24 and disengages the mount 70.

Figure 9:
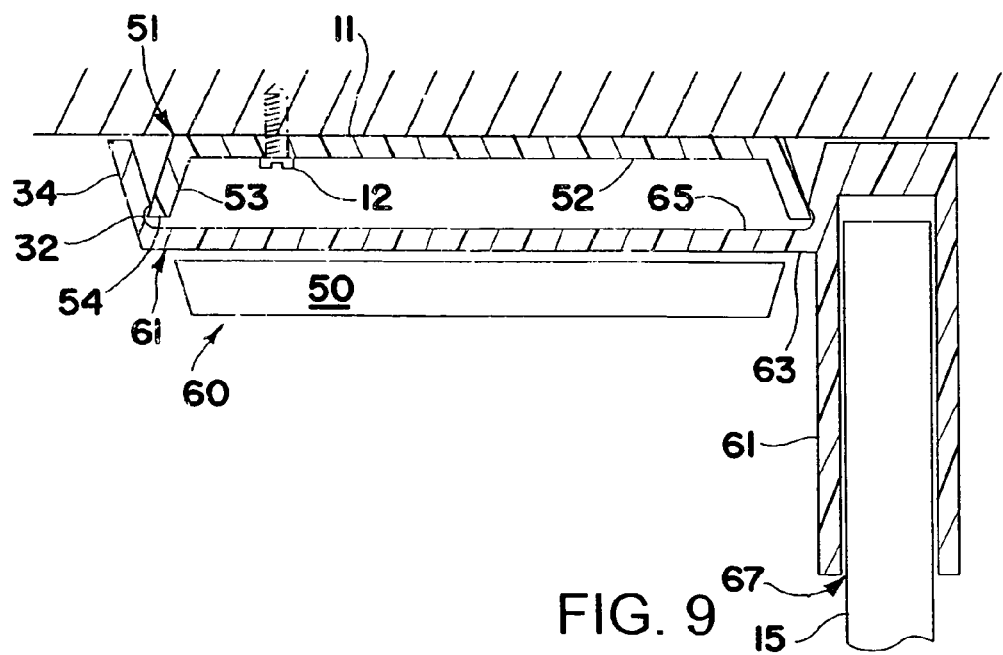
FIG. 9 is a side elevation cross-sectional view of a coupling, including a base the lower peripheral edges of which are interfitted in a circumferential groove providing a detent means by which the base is coupled to the mount, to the lower surface of which, a smoke alarm is secured.

Referring to FIG. 9 there is shown an assembly 60 including a base 51 coupled with a mount 61 with a detent means, one member of which is integral with the mount and the other member of which is integral with the base. The mount 61 includes a dish-shaped member 63 having an outwardly and upwardly flaring peripheral wall 64 around floor 65. The base 51 has a planar floor 52 attached to ceiling 11 with screws 12 and a peripheral wall 53 which extends downward, flares outwardly from floor 52 and terminates in a rim 54, this rim being the other member of the detent means. The end 54 is engaged in a circumferential groove 62 at the base of the outwardly flaring wall 64, the groove 62 serving as a detent to secure mount 61 to base 51. The groove 62 lies at the apex of the angle formed by the wall 64 and floor 65. Smoke alarm 50 is mounted to the lower surface of the floor 65 with appropriate fastening means such as screws (not shown).

At the periphery of dish-shaped member 63 is provided socket 66 having a bore 67 adapted to slidably accommodate the end of rod 15, as described above. To couple mount 61 to base 51, with the smoke alarm 50 secured to the mount 61, it is supported on the end of rod 15 and wall 53 of the base 51 is guided into the wall 64 of mount 61 until the end 54 snaps into the groove 62. The rod 15 is then removed.

Figure 10:
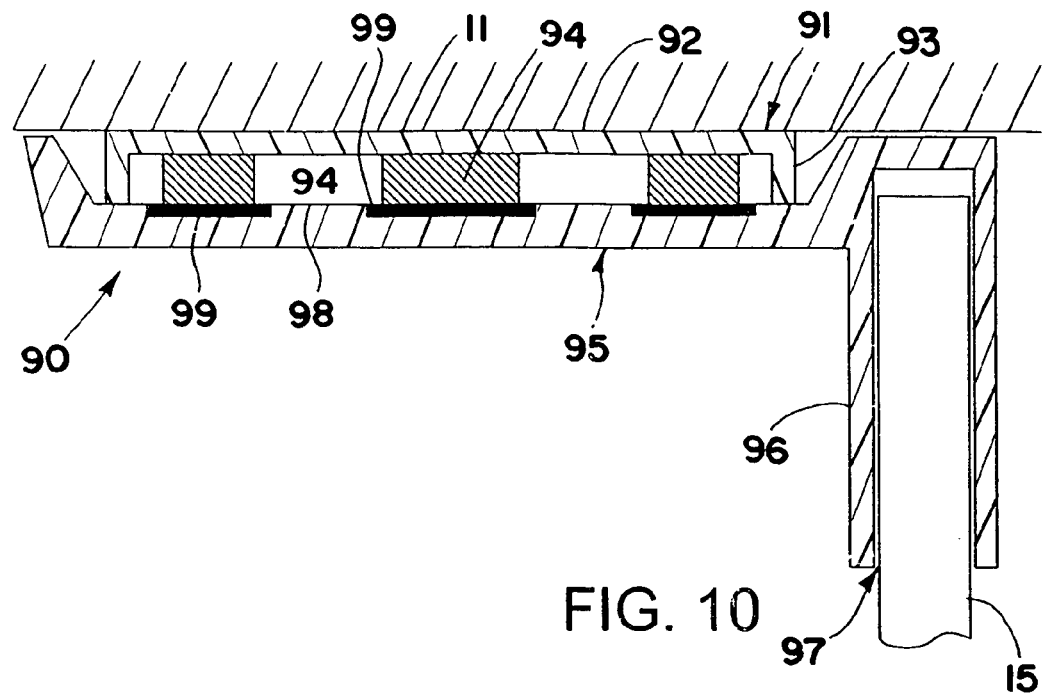
FIG. 10 is a side elevation cross-sectional view of another coupling, including a mount required to having a larger lower surface than that provided by the mount illustrated in FIG. 5.

Referring to FIG. 10, there is shown an assembly 90 for suspending plural relatively heavy articles from a mount 95 coupled to base 91 which is secured as before to ceiling 11 with screws 12. As before, the mount 95 includes a socket 96 having a bore 97 in which a rod 15 is inserted to couple and decouple the mount 95 to the base 91. The base is provided with a floor 92 and a downwardly extending peripheral wall 93. Plural magnets 94 are secured to the lower surface of floor 92 with appropriate fastening means, e.g., countersunk screws (not shown), the lower 20 planar surfaces of the magnets extending to about the horizontal plane in which the periphery of wall 93 lies.

Mount 95 is a planar member having a planar floor 98 oppositely disposed from the surfaces of magnets 94. A single large steel plate 99, although plural steel plates 99 may be used, is secured to the floor 98 and located directly opposite from and in registry with magnets 94 when the mount 95 is coupled to base 91. For increased force to be exerted by the magnets, a central elongated magnet may be used with one or more ring-magnets surrounding the central magnet; correspondingly, an elongated steel plate and one or more annular rings of steel are positioned to be in registry with the magnets when the mount and base are coupled.

Figure 11:
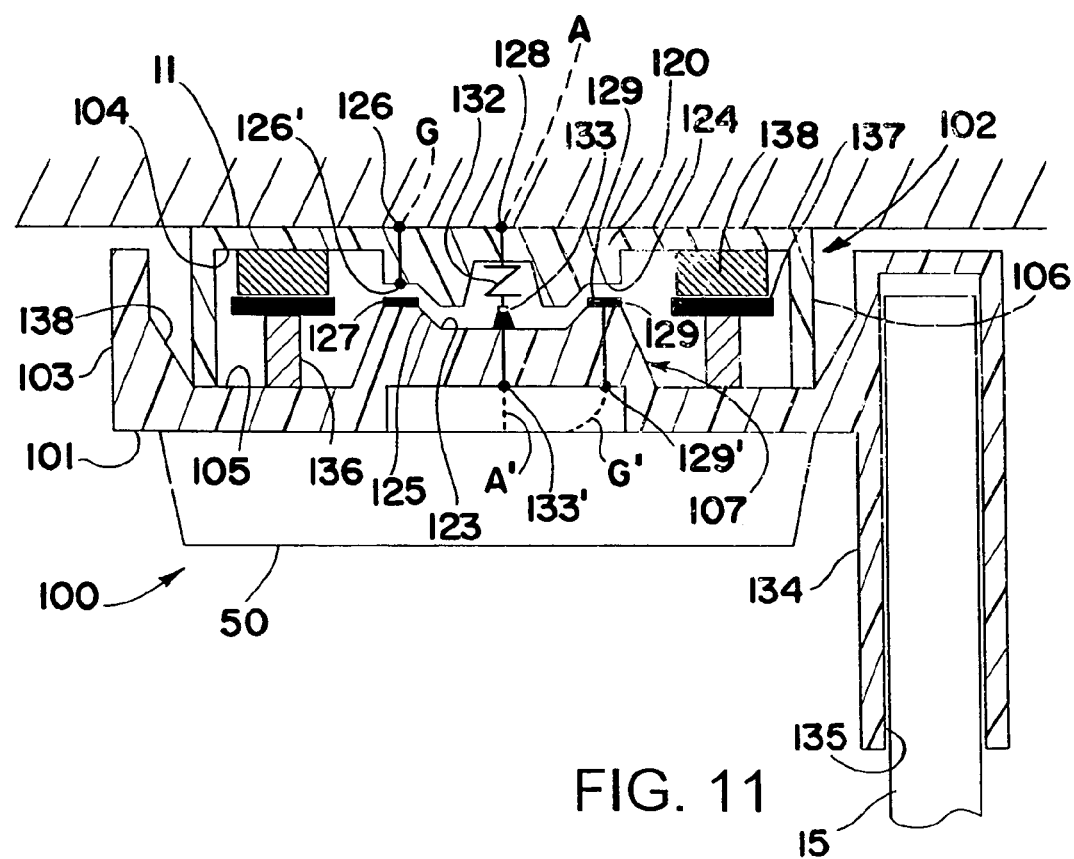
FIG. 11 is a side elevation cross-sectional view of a coupling, including a base "hard wired" to a pair of electrical leads in a ceiling, and electrically connected through the mount to two terminals of a smoke alarm.

Referring to FIG. 11, there is illustrated an assembly 100 comprising a suspended subassembly shown as a dish-shaped mount 101 coupled with a secured subassembly shown as a dish-shaped base 102 secured to ceiling 11. The base has a planar floor 104 and a downwardly extending wall 106 extending peripherally from the floor 104. The lower surface of floor 104 is provided with a downwardly projecting central boss 120 which has a recessed central portion 122 and a circumferential step 124. Electrical leads A and G in the ceiling are connected to terminals 128 and 126 respectively on the upper surface of the floor 104. Terminal 128 is centrally located and in electrical connection through recessed central portion 122, and with a conductive spring 132. Terminal 126, laterally spaced apart from terminal 128 is in electrical connection with terminal 126' on the circumferential step 124 of boss 120.

The mount 101 has upstanding walls 103 extending from the periphery of a floor 105 provided with a an upwardly projecting central boss 107 which has a recessed central portion 123 defined by a circumferential wall 125 to the upper peripheral surface 127 of which is secured an annular conductive strip 129. Centrally located within recessed central portion 123 in the upper surface of the floor 105 of mount 101 is a terminal 133 which is in electrical connection with terminal 133'. Terminal 133' is centrally located within recessed central portion 131 in the lower surface of the floor 105.

When mount 101 is coupled to base 102, terminal 126' is in contact with annular conductive strip 129 which is in electrical connection with terminal 129' in recessed central portion 131 in the lower surface of the floor 105; and spring terminal 132 is in contact with terminal 133 which is in electrical connection with terminal 133' in recessed central portion 131. When coupled spring terminal 132 is in contact with terminal 133 and terminal 126' is in contact with annular conductive strip 129. Electrical leads G' and A' extend from terminals 129' and 133' respectively for connection with appropriate terminals of a smoke alarm 50 mounted to the lower surface of floor 105.

Mount 101 includes a socket 134 having a bore 135, the socket peripherally molded with floor 105. The floor 105 has an upstanding annular wall 136 surrounding the central boss 107, and an annular steel ring 137 is secured to the peripheral surface of annular wall 136.

On the inner surface of floor 104 of base 102 is secured a ring magnet 138, positioned so as to be registrable with the annular steel ring 137 when the mount is coupled to the base. To facilitate coupling the mount to he base, the inner surface of the peripheral wall 103 is tapered at 138 so as to guide the peripheral upper surface of wall 106 until it is in close proximity to the upper surface of floor 105, the annular steel ring 137 is in contact with the ring magnet 138, and the terminals of the smoke alarm are in electrical contact with the leads A and G in the ceiling. As is well known, though a smoke alarm may be "hard wired" to the ceiling, the smoke alarm is provided with a battery which is to operate the device should there be a power failure substantially simultaneously with a fire; the battery in such a smoke alarm must be replaced when the charge runs below a safe level, and removing and replacing the battery is made easy with the assembly 100. Smoke alarms and other devices also have to be removed for various purposes, such as cleaning, testing, repair, etc.

Figure 12:
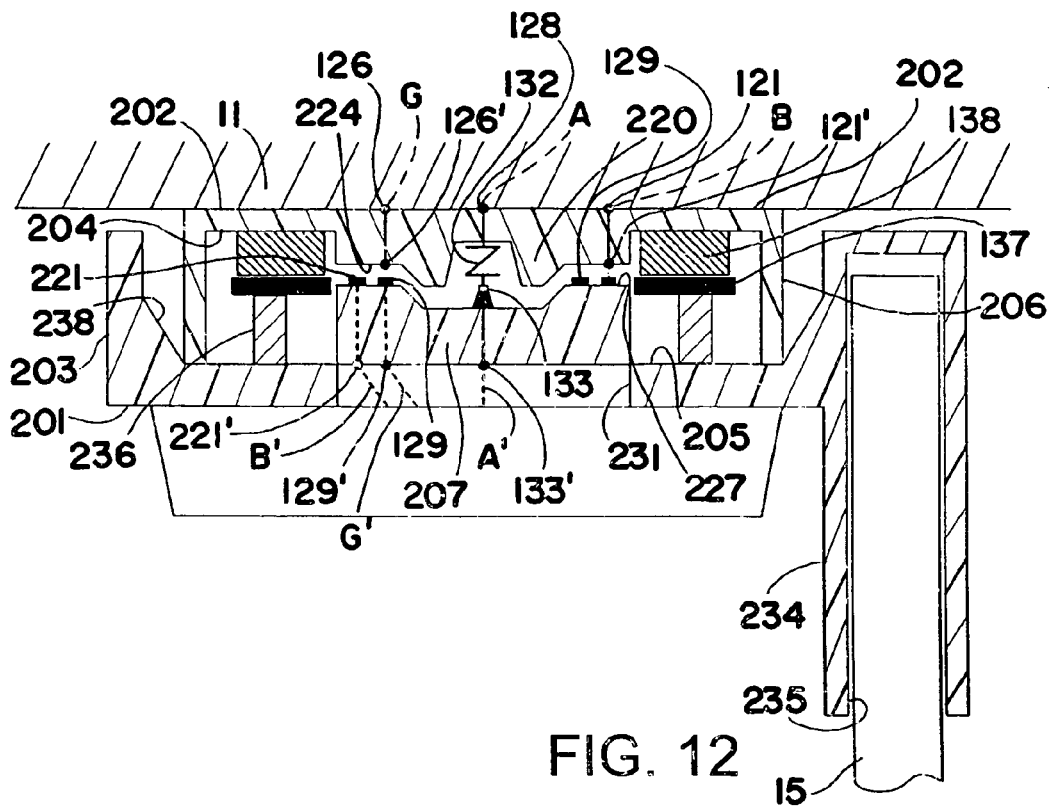
FIG. 12 is a side elevation cross-sectional view of another coupling, including a base "hard wired" to three electrical leads in a ceiling, and electrically connected through the mount to three terminals of a smoke alarm.

Referring to FIG. 12 there is illustrated an assembly 200 analogous to assembly 100 in FIG. 11 except, that provision is made to wire a smoke alarm having three terminals A, B and G. Assembly 200 comprises a suspended subassembly, shown as a dish-shaped mount 201 coupled with a secured subassembly shown as a dish-shaped base 202 secured to ceiling 11. The base has a planar floor 204 and a downwardly extending wall 206 extending peripherally from the floor 204. The lower surface of floor 204 is provided with a downwardly projecting central boss 220 which has a recessed central portion 222 and a circumferential step 224. Electrical leads A, B and G in the ceiling are connected to terminals 128,121 and 126 respectively on the upper surface of the floor 204. Terminal 128 is centrally located in recessed central portion 222 and in electrical connection with a conductive spring 132. Terminals 121 and 126 are laterally spaced apart from terminal 128 and from each other, and are in electrical connection with terminal 121' and 126' respectively on the circumferential step 224 of boss 220.

The mount 201 has upstanding walls 203 extending from the periphery of a floor 205 provided with a an upwardly projecting central boss 207 which has a recessed central portion 223 defined by a circumferential wall 225 to the upper peripheral surface 227 of which is secured annular conductive strips 221 and 129 directly opposite terminals 121' and 126' respectively. Centrally located within recessed central portion 223 in the boss 207 on the upper surface of the floor 205 of mount 201 is a terminal 133 which is in electrical connection with terminal 133'. Terminal 133' is centrally located within recessed central portion 231 in the lower surface of the floor 205.

When mount 201 is coupled to base 202, terminal 126' is in contact with annular conductive strip 129 which is in electrical connection with terminal 129' in recessed central portion 232 in the lower surface of the floor 205; and spring terminal 132 is in contact with terminal 133 which is in electrical connection with terminal 133' in recessed central portion 231. Electrical leads G', A' and B' extend from terminals 129', 133' and 221' respectively for connection with appropriate terminals of a smoke alarm 50 mounted to the lower surface of floor 205.

Mount 201 includes a socket 234 having a bore 235, the socket peripherally molded with floor 205. The floor 205 has an upstanding annular wall 236 surrounding the central boss 207, and an annular steel ring 137 is secured to the peripheral surface of annular wall 236.

On the inner surface of floor 204 of base 202 is secured a ring magnet 138, positioned so as to be registrable with the annular steel ring 137 when the mount is coupled to the base. To facilitate coupling the mount to he base, the inner surface of the peripheral wall 203 is tapered at 238 so that when the peripheral upper surface of wall 206 is in close proximity to the upper surface of floor 205, the annular steel ring 137 is in contact with the ring magnet 138 and the terminals of the smoke alarm are in electrical contact with the leads A, B and G in the ceiling.

Figure 13:
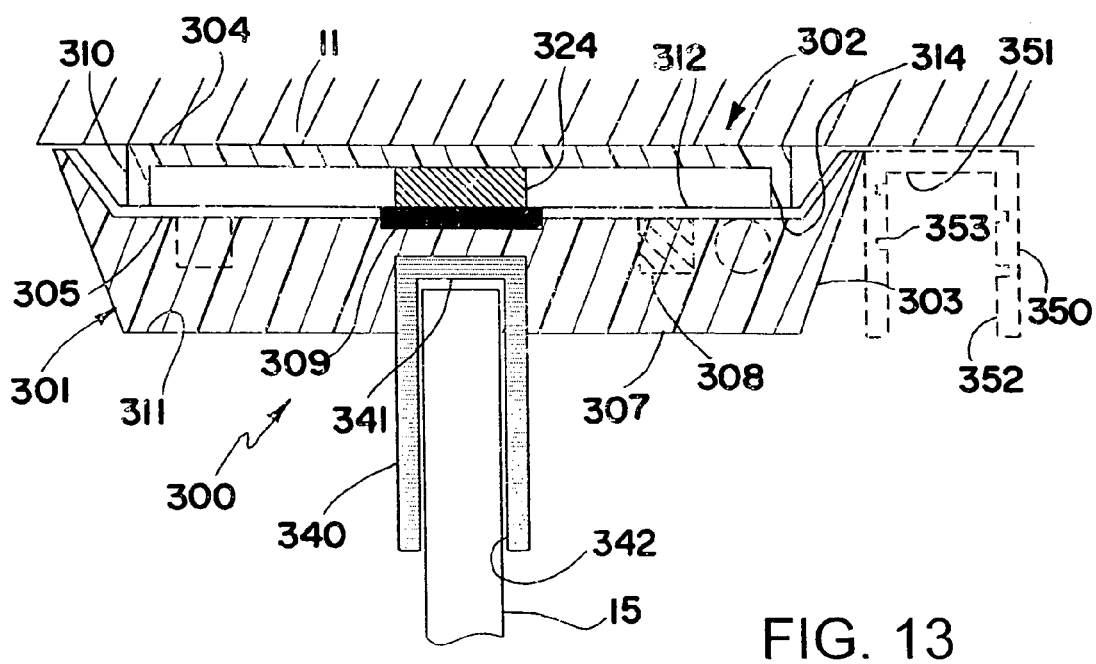
FIG. 13 is a side elevation cross-sectional view of a coupling, including a base to which is magnetically coupled the base of a smoke alarm; a socket or other rod-attachment means is provided in the center of the cover of the smoke alarm; optionally, the socket is secured peripherally and may be internally threaded as shown in phantom outline.

Referring to FIG. 13, there is schematically illustrated an assembly indicated generally by reference numeral 300, comprising a secured subassembly 302 and a suspended subassembly 301, by itself, which is the article to be suspended. The secured subassembly 302 includes a base 304 and a magnet 324 secured therewithin with fastening means (not shown) to ceiling 11 in a manner analogous to that illustrated and described in FIG. 1. Illustrated in FIG. 13 is a smoke alarm 303 having a cover 307 removably secured to a component-mounting floor 305, for mounting electrical components. The component-mounting floor 305 is analogous to, and may be substituted for, the planar floor 98 of the planar member 95 in FIG. 10. The smoke alarm has no other base, as is common for smoke alarms in which the component-mounting floor is removably mounted to a base, typically with a bayonet mount. Among the components is a battery 308 which is to be periodically replaced. The floor 305 is recessed in the center to have a steel plate 309 fixedly held therein.

The cover 307 is provided with a socket 340, in an embodiment, it is near the center of the cover and integrally molded therewith, the socket having a bottom 341 inwardly spaced from the cover's lower surface 311 for a distance sufficient to provide secure purchase for the end of a rod 15 which is slidably snugly inserted in bore 342 when the smoke alarm 303 is to be removed from, or replaced onto the base 304. If desired, the bore 342 may be internally threaded with threads 353 to receive the end of a complementarily threaded rod (not shown). If desired the cover may be provided with a through-aperture defined by the diameter of the bore 342, into which through-aperture the rod 15 may be inserted and stopped by steel plate 309. To remove the smoke alarm 303 however, a force exerted on the rod 15 to angulate it and dislodge the steel plate 309 from contact with magnet 324 causes pressure to be exerted on the periphery of the through-aperture. Since the cover 307 is typically made of relatively fragile plastic, a through-aperture is less preferred to socket 340.

In view of the relatively fragile nature of a typical cover 307, an alternative to providing a socket 340 within the cover, is to provide a socket 350, shown in phantom outline, at the periphery of component-mounting floor 305, the socket 350 molded integrally with floor 305. The socket 350 has a bottom 351 extending laterally from the mounting floor 305, and the socket's bore 352 is adapted to receive the end of rod 15. If desired, the bore 352 may be internally threaded with threads 353 to receive the end of a complementarily threaded rod (not shown).

Whether the socket is provided within the cover 307 or secured to the mounting floor 305, it serves to transmit the force exerted by the end of rod 15 to dislodge the smoke alarm 303 from base 304. After the smoke alarm is lowered, the cover 307 is manually removed from the component-mounting floor 305 and the battery 308 removed and replaced.

Though base 304 may be a plate, it may include a peripheral wall 310, the peripheral lower surface 314 of which extends downward to near, or in contact with the inner surface 312 of the mounting floor 305. The "inner surface" refers to the surface of the floor 305 which is on the other side from that on which the components are mounted. The peripheral surface 314 serves to stabilize the ferrous metal plate 309 and register it accurately against the magnet 324. Moreover, when the rod 15 is angulated, the surface 314 provides a fulcrum to facilitate the steel plate 309 breaking contact with the magnet 324.

Figure 14:
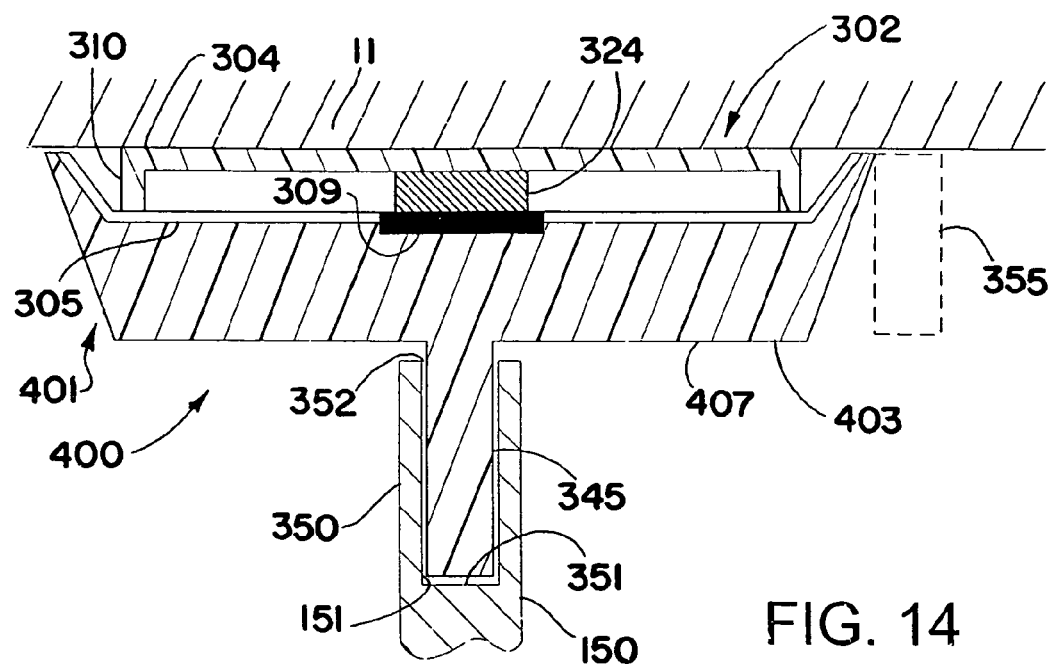
FIG. 14 is a side elevation cross-sectional view of a coupling, including a base to which is magnetically coupled the base of a smoke alarm; a finger-like protrusion is secured to the center of the cover; optionally, the finger-like protrusion is secured peripherally, as shown in phantom outline.

Referring to FIG. 14 there is schematically illustrated an assembly 400 comprising secured subassembly 302 secured to ceiling 11 and suspended subassembly 401 including a smoke alarm 403, analogous to the assembly 300 in FIG. 13, except that instead of socket 340, smoke alarm 403 has a cover 407 from which projects a finger-like protrusion 345. The location of the finger-like protrusion 345, like the location of the socket 340, is not narrowly critical, but because a person standing on the floor of a room may not visually recognize the direction in which the advantage of maximum leverage lies, the finger-like protrusion 345 is placed near the center of the cover 407. If desired, the finger-like protrusion 345 may be So threaded with threads 346 to be received in the complementarily threaded bore in the end of a rod (not shown).

For the same reason given above, namely the relative fragility of cover 407, the protrusion 345 may be replaced with a protrusion 355, shown in phantom outline, at the periphery of component-mounting floor 305, molded integrally therewith; as before, if desired, the protrusion may be threaded to be received in the complementarily threaded bore in the end of a rod (not shown).

Figure 15:
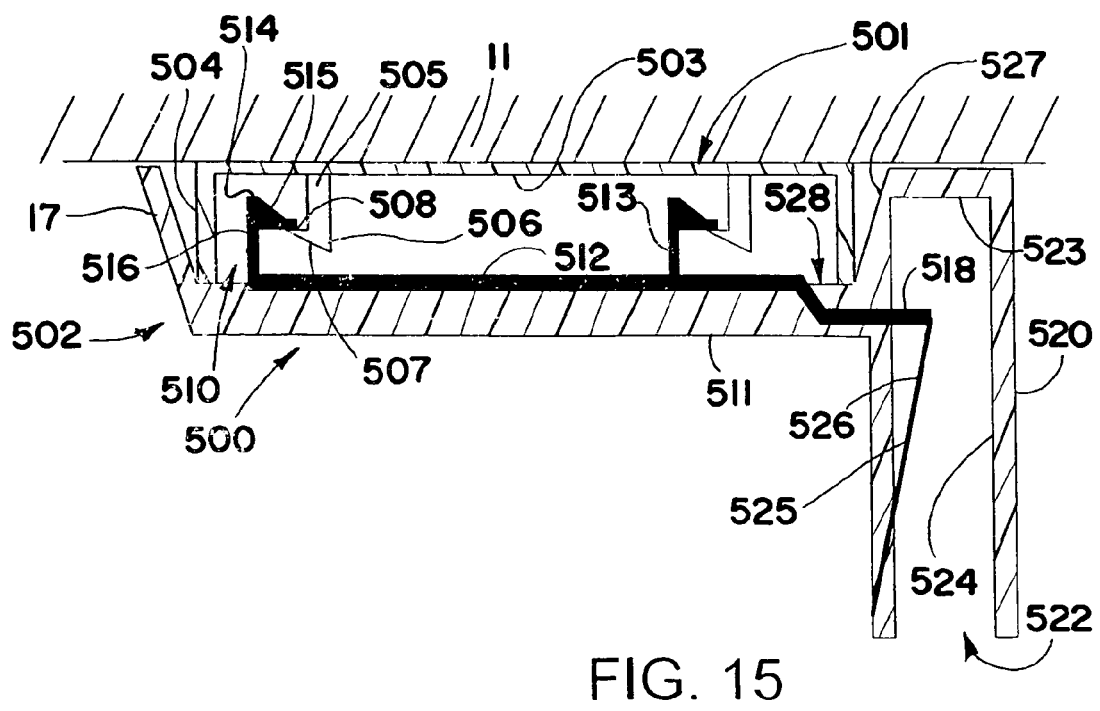
FIG. 15 is a side elevation cross-sectional schematic illustration of a coupling, including a base and mount coupled with a releasable latch means.

The detent means illustrated in FIG. 9 and the magnet and steel plate combination illustrated in the other Figures may be replaced with a latching means 510 in an assembly 500 illustrated in FIG. 15. The assembly 500 comprises a secured subassembly or base member 501 and a suspended subassembly or mount 502; the latter is latched to the base member 501 which has a planar floor 503 secured to ceiling 11, and a peripheral wall 504. Pending from the floor 503 are laterally spaced apart catches 505, which may be integrally molded with the floor 503. In an example each catch may terminate in a V-shaped portion 506. The V-shaped portion 506 may have a generally triangular cross section having an inclined surface 507 and a substantially lateral surface 508. Other shapes and styles of latch, catch, etc. may be used.

Mount 502 has a generally planar member 511 adapted to receive a latching arm 512 which is translatable to and fro relative to catches 505, so as to engage and disengage them. In the exemplary embodiment of FIG. 15, latching arm 512 includes upstanding latches 513, the bases of which are fixed to latching arm 512 and each of latches 513 may terminate in a V-shaped portion 514 having a generally triangular cross section, inclined so as to provide a downwardly extending stub 515 with a substantially lateral surface 516 which rests upon lateral surface 508 when engaged.

One end 518 of latching arm 512 projects through the periphery of base 511 into the bore 522 of socket 520 which may be integrally molded with planar member 511, the bottom 523 of the socket extending from the periphery of planar member 511. The end 518 of the latching arm 512 is attached to one end of a spring-biased lever arm 525 biased away from wall 524 of socket 520 by a spring 526. The lever arm 525 is located so that the end of a rod 15 (not shown) slidably inserted in bore 522 will compress spring 526 and urge latching arm 512 away from the longitudinal center-line of the rod. The "throw" of the latches 513 is sufficient to disengage stubs 515 from the catches 508 thus releasing mount 502 from the base member 501.

To facilitate replacing mount 502 which is supported on the end of a rod, on the base member 501, the planar member 511 is provided with an outwardly inclined wall 517 remote from and oppositely located from socket 520. Further the outer surface of wall 524, near the bottom 523 of the socket 520, is provided with an outwardly inclined surface 527 to guide the lower peripheral surface of wall 504 into contact with inner surface 528 of planar member 511, as the mount 502 is urged upwards along mating inclined surfaces 507 of each catch and those of stubs 515. As the rod is then withdrawn, pressure against the lever arm 525 is released and the spring 526 causes the stubs 515 to engage the to engage the terminal portions 506 of the catches.

If desired, to replace the mount 502 on the base member 501, the lower end of socket 520 may be inserted in a socket at the end of a rod so that spring 526 is not compressed. When the mount 502 is then urged up against the base member 501, the spring 526 is compressed as the inclined surfaces of the stubs 515 are urged along the correspondingly inclined surfaces 507 of the V-shaped terminal portions 506 of the catches until the ends of the stubs clear the portions 506; the spring 526 is then released and secures the stubs in position on the lateral surfaces 508 of the catches.

Figure 16:
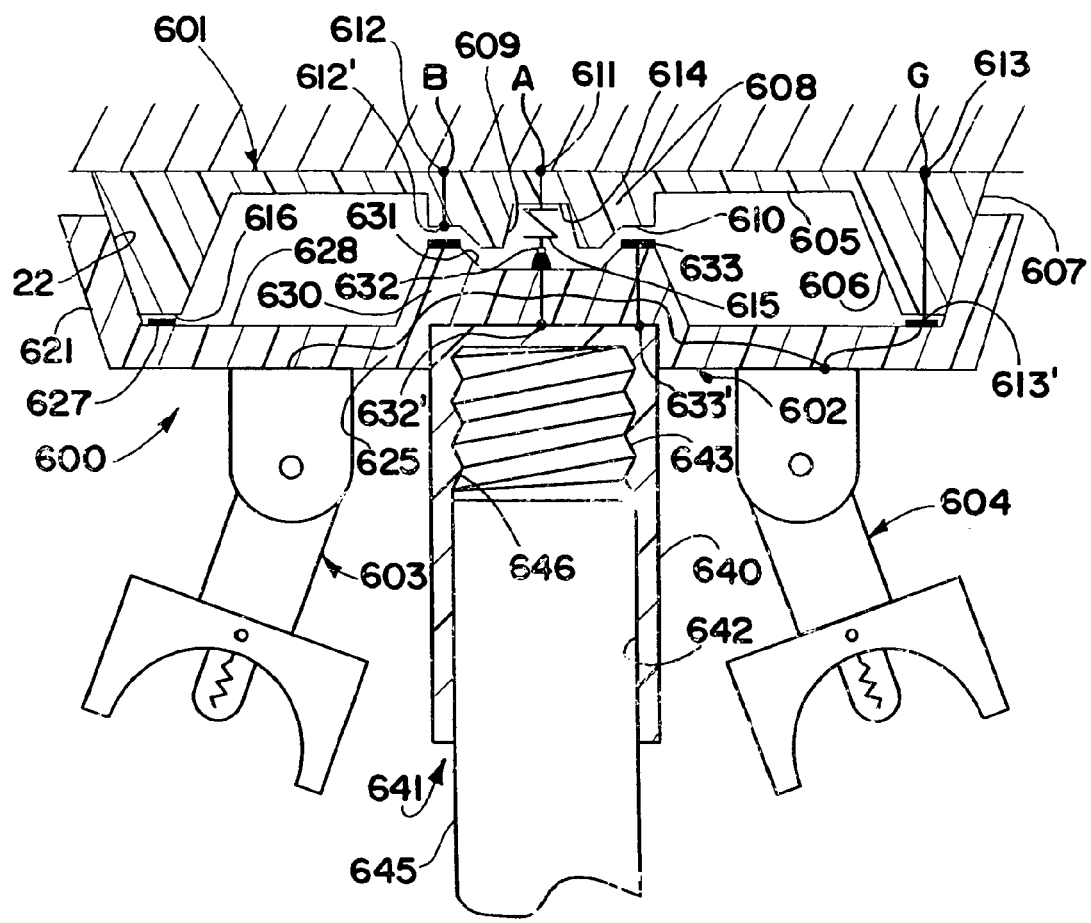
FIG. 16 is a side elevation cross-sectional view diagrammatically illustrating a coupling, including a base to which is interference-fitted a mount carrying a pair of lighting fixtures; an internally threaded socket is provided in the center of the mount. The component-mounting floor is substituted for the planar member of the mount in FIG. 10.

Referring to FIG. 16 there is schematically illustrated an assembly 600 comprising a secured subassembly or base member 601 secured to ceiling 11, and a suspended subassembly or mount 602 from which a pair of lighting fixtures 603 and 604 is suspended, the lights requiring electrical current to bulbs in the fixtures, and the two subassemblies being adapted to be coupled by an interference fit therebetween, and decoupled when desired.

As illustrated base member 601 includes a disc-shaped member 605 having a peripheral wall 606, the outer surface 607 of which is inwardly inclined. The lower surface of disc-shaped member 605 is provided with a downwardly projecting central boss 608 which has a recessed central portion 609 and a circumferential step 610. Electrical leads A (hot), B (neutral) and G (ground) in the ceiling are connected to terminals 611, 612 and 613 respectively on the upper surface of disc-shaped member 601. Three leads are shown though only first and second current-carrying leads may be necessary. Terminal 611 (first terminal) is centrally located and in electrical connection with a conductive spring 615 in recessed central portion 614. Terminal 612 (second terminal), laterally spaced apart from terminal 611, is in electrical connection with terminal 612' on the circumferential step 610 of boss 608. Terminal 613, laterally spaced apart from both terminals 611 and 612, is in electrical connection with terminal 613' on the peripheral lower surface 616 of wall 606.

The mount 602 includes a mounting member 625 which has a generally planar floor 628 and an upstanding peripheral wall 621; the wall 621 is outwardly directed and inclined from the vertical center-line of mounting member 625 to which fixtures 603 and 604 are mounted; and the inner surface 622 of wall 621 is complementarily inclined to be tightly fitted over outer surface 607 of wall 606 until the peripheral surface 616 is biased against a conductive ring 627 secured near the periphery of the inner surface 628 of cover 625. The conductive ring 627, in turn, is in electrical connection with leads to the bases of lighting fixture 603 and 604.

The upper (or inner) surface of planar floor 628 has a central boss 630 projecting upward and having a central recess 631 within which is centrally located a terminal 632 (third terminal) adapted to contact central terminal 615 (first terminal) when the subassemblies are coupled. The upper peripheral surface of the circumferential shoulder of the boss 630 has a conductive ring 633 (fourth terminal) fixedly secured therein so as to be in contact with terminal 612' (and in electrical connection with second terminal 612) when the subassemblies are coupled. Thus terminals 632 and 633 are in electrical connection with appropriate hot and neutral leads 632' and 633' respectively which are in turn connected to the appropriate leads for the lighting fixtures.

Also centrally located in mount 602, and, if desired, which may be axially aligned with central boss 630, is a socket 640 having a bore 641. The walls 642 of the socket 640 are internally threaded with threads 643 so as to threadedly receive threaded end 646 of rod 645.

It will now be evident that the method of releasably coupling first and second subassemblies of an assembly to be mounted on a ceiling, comprises, securing one of the subassemblies, the first or secured subassembly, to the ceiling, the secured subassembly including a first portion of a coupling means; supporting the other of the subassemblies, the second or suspended subassembly, on the end of an elongated rod, the suspended subassembly including a second portion of the coupling means and a rod-acceptance means; registering the suspended subassembly to the secured subassembly to engage the coupling means; and, removing the rod.

To decouple the suspended subassembly from the secured subassembly, the method comprises, attaching one end of a rod a the rod-attachment means secured to the suspended subassembly; exerting a force on the rod sufficient to decouple the suspended subassembly from the secured subassembly; supporting the decoupled suspended subassembly on the end of the rod, and lowering the suspended subassembly.

The method of releasably magnetically coupling subassemblies of a an assembly comprising a base member and a mount comprises, first securing the base member to a ceiling of a room so as to provide a secured subassembly; interposing a magnet and a ferrous plate between the base member and the mount while supporting the mount on the end of a rod, the mount including either the magnet or the ferrous plate, and a rod-attachment means; registering the ferrous plate to the magnet to engage them; and, removing the rod.

The method also may comprise, securing a dish-shaped base to the ceiling, the base including a first portion of a magnet coupling means fixedly attached therein; supporting a dish-shaped mount on the end of a rod, the second subassembly including a second portion of the coupling means and a rod-attachment means; releasably magnetically coupling the mount to the base; and, removing the rod.

The mount may be cup-shaped and may have a rigid floor from which an article is to be suspended from the ceiling; and the base also may be dish-shaped having a planar floor to be secured to the ceiling, and walls directed vertically downward so as to be matingly received in the mount in male-female relationship. A magnet in the base is secured to its floor, remote from the ceiling for maximum effect. The dish-shaped mount also has generally upright walls and a ferrous plate fixedly secured to its floor; and, a rod-attachment means peripherally disposed on the mount.

In an embodiment the dish-shaped base having a magnet mounted therein is secured to the ceiling; the mount is a smoke detector and alarm assembly having a base and removable cover; on one side of the base is mounted smoke-sensing and alarm-giving means; on the other side of the base is mounted a ferrous plate; and the rod-attachment means is secured to the mount, either peripherally on the base of the smoke alarm, or on the cover; and the mount is matingly coupled with the base. Thus a person standing on the floor of a room can insert the rod in the rod-attachment means, and by manually applying sufficient lateral force on the rod at a location remote from the rod-attachment means, can angularly displace the rod relative to the vertical thus decoupling the mount from the base.

Having thus provided a general discussion, described the overall combination of subassemblies in detail and illustrated the invention with specific examples of the best mode of carrying it out, it will be evident that the invention may be incorporated in numerous applications only some of which are described. The ability to attach and remove an article to the ceiling using a rod to decouple a magnetic coupling provides an effective solution to an age-old problem. It is therefore to be understood that no undue restrictions are to be imposed by reason of the specific embodiments illustrated and discussed, and particularly that the invention is not restricted to a slavish adherence to the details set forth herein.

ADDITIONAL EMBODIMENTS

Several additional embodiments of remotely attachable and separable coupling system according to the present invention are illustrated in FIGS. 17-36. In these embodiments the retention mechanism that retains the mount and base member together would be hidden from normal view when the system is assembled. Thus, the complete system has an aesthetically pleasing structure, while maintaining the basic functionality of the previously described embodiments.

Referring briefly to FIGS. 17-21, a remotely attachable and separable coupling system 700 includes both the mentioned "hidden" feature and a dual retention mechanism. The system 700 includes a base member 701, a mount 702, and an installation and removal tool 703. The base member 701 is intended to be secured to a fixed structure or to some other device, and the mount 702 mates to the base member 701. Removal and installation of the mount 702 is accomplished through the use of the installation and removal tool 703. The installation and removal tool 703 may be used for remote installations of the system 700, allowing the user to remain safely on ground level while installing or removing the mount 702 relative to the remotely located or otherwise difficult to reach base member 701. A device 704 may be coupled to the mount 702; exemplary devices may be a smoke detector or other detector, a light fixture (or part thereof), a sign, a signaling device, a viewing device such as a camera, a display, etc. Various techniques, e.g. screws, clips, adhesive, etc., may be used to couple the device 704 to the mount 702. The device 704 may be a part of and/or be integral with the mount 702. The components of this embodiment of the system 700 will now be described in more detail.

The dual retention mechanism 710 for holding together or coupling the base member 701 and mount 702 includes a magnetic coupling system or device 711 and a selectively operable mechanical retainer 712. If desired, the retention mechanism 710 may include more than two coupling or retainer systems to hold the base member and mount together. Also, it will be appreciated that features of the retention mechanism 710 may be used alone, with other parts that are illustrated and described herein and/or with still other systems, devices or the like.

The magnetic coupling system 711 includes at least one (or more) magnet 713 and another part 714 to which the magnet may hold with a magnetic retention force. Such other part 714 may be a ferrous plate, as was described above, another metal or other material to which a magnet may tend to hold, or even another magnet. In the embodiment illustrated in FIGS. 17-21 three magnets 713a, b, c are shown distributed about the mount 702. Each magnet may couple magnetically to the ferrous plate 714 or the like. In the embodiment illustrated in FIGS. 22-27 four magnets, 713a-713d are shown.

The selectively operable mechanical retainer 712 provides a secure mechanical coupling between the base member 701 and mount 702 when coupled together. Such mechanical coupling ordinarily would retain the base member 701 and mount 702 coupled together in case the magnetic coupling system 711 were to release unexpectedly or otherwise. The selectively operable mechanical retainer 712 includes a movable grabber member 715 and a retention member 716. The grabber member 715 may be operated by the installation and removal tool 703.

The installation and removal tool 703 is used to couple and/or to decouple the mount 702 with respect to the base member 701. The tool includes decoupling arms 717 that cause the grabber member 715 to retract from a retaining or locking relation with the retention member 716 as the decoupling arms are inserted into the mount 702. The tool 703 has a base 718a with a socket 718b that accepts an elongated member, such as a pole 720. The socket and pole may be threaded at 719a to secure the base and pole together in a threaded connection coupling, and a set screw 719b may be used to lock the pole to the base, e.g. preventing unscrewing from the threaded connection. The pole may increase the reach of the tool to permit access to normally out of reach locations for coupling and/or decoupling the mount 702 with respect to the base member 701 of the system 700.

In FIGS. 17-21 particularly several views of the base member 701 are shown. The base member 701 forms the inner half of the system 700 of the invention and is secured to a structure 721 (FIG. 18), such as a wall, a ceiling or a pole. In many uses of the invention the structure 721 may be relatively fixed, e.g. a wall, or movable, e.g. a pole. The base member 701 includes several subcomponents, one of which is the base plate 714. The base plate 714 is the primary instrument for attaching the base member 701 to a fixed object and provides strength and rigidity to the base member 701. Fasteners, such as screws 722, are used to secure the base plate to the structure 721. Depending on the mounting structure, other components may be required. For example, if the base member 701 were to be secured to a pole, a U-shape bracket may be employed. The base plate 714 is made from a rigid material, such as steel, but it may be made out of any suitable material that provides the strength and rigidity to support the mount 702 and any device 704 attached to the mount. In an embodiment, the base plate 714 is of a ferrous or other material to which magnets 713 may be held by magnetic force. If the base plate 714 were of non-magnetic material, magnetic materials may be attached to the base plate 714 to provide a coupling mechanism for the magnets 713 of the magnetic coupling system 711. An example of an alternative coupling system to couple the base member and mount may use one or more Velcro® fasteners. The magnetic coupling system 711 will be described in more detail below. The base plate 714 also is used to attach the remaining subcomponents of the base member 701. These subcomponents include the retention member 716, an electrically conductive ring 723a, a fixed electric terminal 724a, and an electrical insulation ring 725.

It will be appreciated that the system 700 of the invention has a dual retention mechanism 710 that includes two different coupling systems to secure the mount 702 to the base member 701. The first, the magnetic coupling system or device 711, was briefly described above. The second coupling system is the mechanical coupling system 712, also referred to above as the selectively operable mechanical retainer, which is distributed between the base member 701 and the mount 702. The base member 701 coupling component includes the retention member 716. The retention member 716 is attached to the base plate 714 and may be secured by fasteners, such as a nut and bolt or a screw, or it may be bonded to the base plate 714. The retention member 716 can be constructed in several different forms. For example, the retention member 716 may be rectangular in shape, or it may be a set of rails mounted on each side of the base plate 714, or it may be a circular ring. A circular ring has an advantage over other designs in that no matter what the orientation of the mount 702 is relative to the base member 701, the retention member 716 will always be aligned with its respective member in the mount 702. A rectangular design or rails may only mate correctly in two, four or other specified orientations. The retention member 716 has a groove, recess, chase, or other geometry 716a along its outer edge to accept the grabber member 715, such as a clip or similar device, from the mount 702, such that after the mount 702 and the base member 701 are mated together, the clip fits inside the groove or other geometry of the retention member 716 and prevents the two units from separating. Separation requires that the clip 715 be mechanically moved from a position in which it cooperates with the retention member 716 to hold the base member and mount together to a position releasing the mount from the base member. The retention member 716 may be made of plastic or any other suitable material.

Electrical connections 726 may be provided between the base member 701 and mount 702. For example electrical connections on the base member 701 may provide electrical power from the base member 701 to the mount 702. This electrical power may be used to power a device, e.g. device 704, which is attached to or is part of the mount 702. For example, a light fixture type device 704 may be the recipient of the power, in which case the power will be 100, 115, 220, 240 VAC or some other suitable line voltage or other voltage. The electrical connections also may be used as a signal connection, in which case it will transmit data to and from a device attached to the mount 702 relative to some remote location. For example, the device 704 attached to the mount 702 may be a smoke detector and the signal connection may be to a remote computer, the computer having the responsibility of monitoring the status of one or more devices within a building. If the smoke detector detects a problem (e.g. low battery charge, high temperature, or smoke), the smoke detector will transmit the data over the signal connection to the central computer and the computer may act accordingly. The electrical connections also may be used to monitor the status of the system 700 and/or the device 704. For example, instead of sending a digital transmission to a central computer, the signal may be a simple contact closure to an alarm panel, or some other indication device. The electrical connections or electrical coupling apparatus between the base member 701 and the mount 702 can take on various forms, several examples being multiple fixed terminals or fixed conductive rails, each spanning a section of the base member 701 and mount 702 respectively. Such electrical coupling apparatus may require that the mount 702 and the base member 701 be aligned in a specific orientation relative to each other in order to make the proper connections.

Another approach for the electrical connections 726 uses electrically conductive circular rings 723a/723b and centrally located fixed electrical terminals 724a/724b, respectively, associated with the base member 701 and mount 702. The conductive circular rings 723 (refers to both 723a, 723b) and fixed terminals 724 (refers to both 724a, 724b) provide a quick and safe mechanism for connecting and disconnecting the electrical signals and/or power between the base member 701 and the mount 702. Furthermore, such electrical connection arrangement is not dependent on the orientation of the base member 701 relative to the mount 702. The conductive rings 723 may be rigid or flexible (or one may be rigid and the other flexible). Using at least one flexible conductive ring 723 improves the contact to the opposing electrical connection part, e.g. another electrically conductive ring, in the opposing base member 701 or mount 702 as the two are mated together. A ring 725 separates the conductive ring 723 from the fixed terminal 724. The ring 725 may be of electrically insulating material or other material. It may be electrically conductive if electromagnetic shielding or impedance matching characteristics are desired. The ring itself also could be replaced by an air gap that provides suitable electrical insulation characteristics. The ring 725 may include a support portion 725s that supports the electrically conductive ring 723a. While only two electrical connections 726 between the base member 701 and mount 702 are shown in the drawings, the invention is not limited to two connections and there may be fewer or more than two electrical connections between the base member 701 and the mount 702. For example, multiple electrical connections may have multiple conductive rings 723, each conductive ring having a slightly larger diameter than the previous (radially inward) conductive ring, each conductive ring representing a separate electrical connection to the opposite base member or mount, and each conductive ring being separated from adjacent electrically conductive rings by an insulation ring 725.

In FIGS. 19A-D the base member 701, retention member 716, circular electrically conductive ring 723a, fixed terminal 724a, ring 725 and support portion 725s of the ring 725 are shown. Wires, bus connections, etc., may provide electrical connections from some location to the conductive ring 723a, fixed terminal 724a and/or other electrical members of the base member 701.

Figure 17:
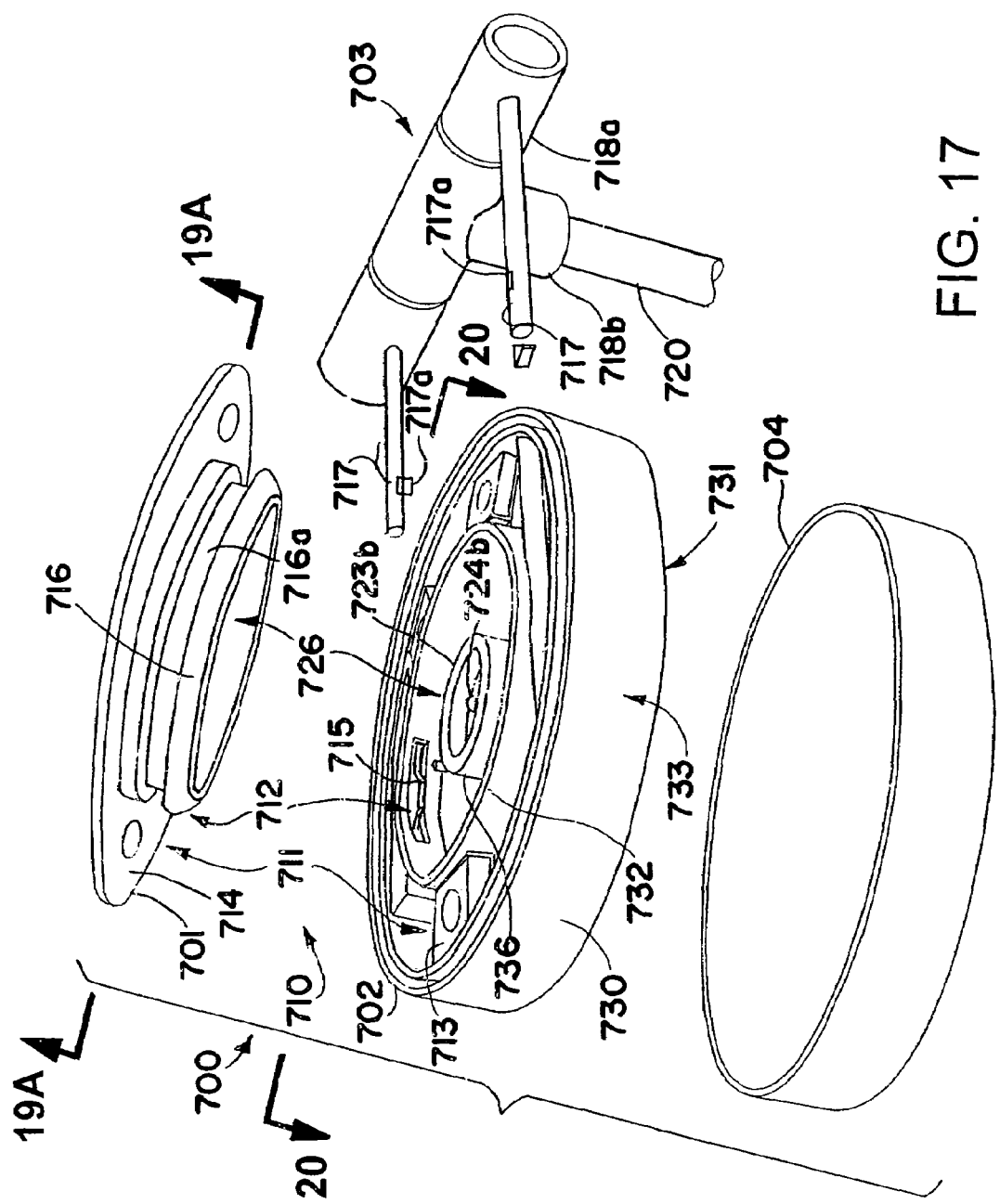
FIG. 17 is an exploded isometric view of a remotely attachable and separable coupling system of the invention employing a dual retention mechanism.

Referring to FIGS. 17, 20, and 21 the mount 702 is shown. The mount 702 mates to the base member 701 and forms the outer shell of the system 700 of the invention. As is the case with the base member 701, the mount 702 also includes several subcomponents. One subcomponent is a cover 730. The cover may be made of a rigid plastic or similar material. The cover could be metal and, if necessary, have suitable electrical insulation to avoid short circuits in electrical connections 726. The face 731 of the cover is flat to provide a mounting platform for a device 704, such as a light fixture or a smoke detector. The face 731 may be some other appropriate shape to facilitate attaching to a device 704 or for another purpose. Such devices may be electrically powered or battery powered, depending on their intended purpose. If necessary, electrical connections may be provided from the electrically conductive ring 723a, fixed terminal 724a and/or any other terminals in the mount 701 to corresponding terminals of the device 704. Also, as was mentioned above, the device 704 may be integral with or substantially integral with the mount 702.

The cover 730 has internal guide rings 732, which may be circular or other appropriate shape, to facilitate mating the mount 702 to the base member 701. The guide rings 732 may be angled slightly to ease installation of the mount 702. The outer wall 733 of the mount 702 helps to minimize dirt and dust entry in the area between the mount 702 and the base member 701. The outer wall 733 also increases the strength of the overall structure and improves the appearance of the system 700. Magnet mounts or standoffs 734 provide an elevated mounting surface for the magnets 713, such that the magnets are approximately flush with the top surface of the outer wall 733 and can mate with and secure to the plate 714. The standoffs 734 may be of plastic to avoid interfering with the operation of the magnets 713, or may be of some other material. The magnets 713 and associated components will be discussed in more detail below. Similarly, the conductive ring standoff 736 provides an elevated mounting surface for a conductive ring 723b such that the conductive ring 723b also is approximately flush with the top surface of the outer wall 733.

The electrical connections 726 within the mount 702 are similar to the electrical connections within the base member 701. These electrical connections may be for power, such as 115 VAC for a light fixture, for a signal connection to digitally communicate to a remote device, for a simple status indication, such as a contact closure indicating whether the device mounted on the cover is operational, etc. The coupling apparatus for the electrical connections are similar to those of the base member 701. This type of electrical connection provides a quick and safe way to connect and disconnect the electrical signals without the requirement of physically removing a connection (e.g. disconnecting a wire from a terminal).

Figure 18:
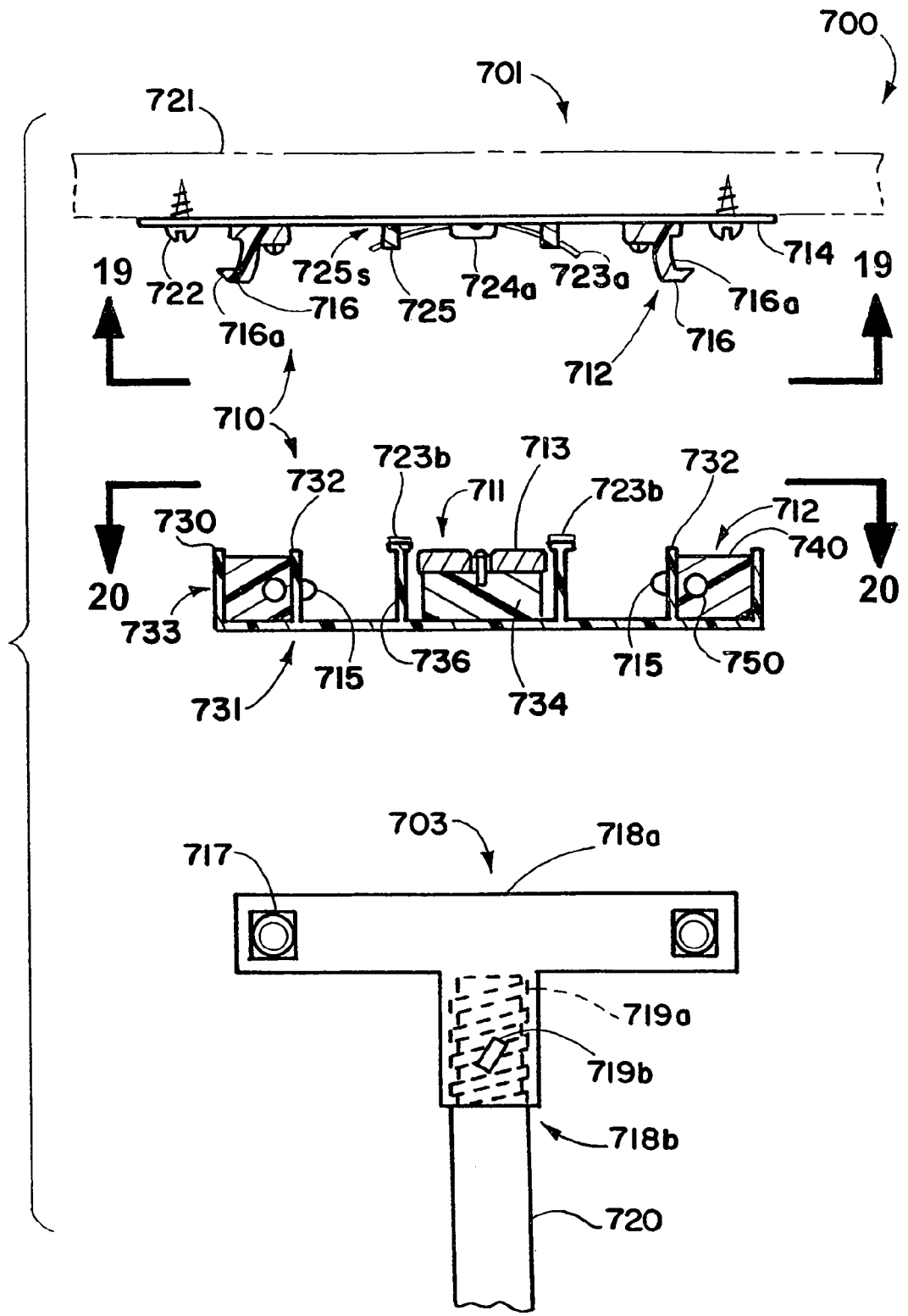
FIG. 18 is an exploded section view of the system of FIG. 17.
Figure 19A:
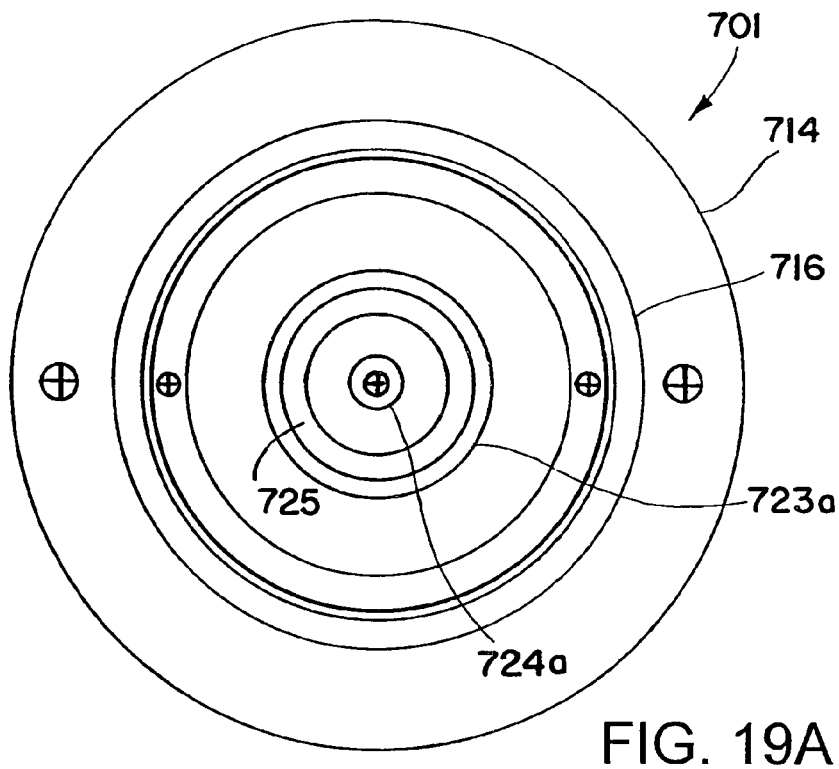
FIG. 19A is a bottom view of the base member of the system of FIG. 17.
Figure 19B:
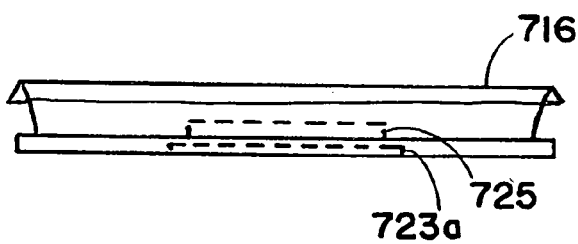
FIG. 19B is a side elevation view of a retention member for the system of FIG. 17.
Figure 19C:
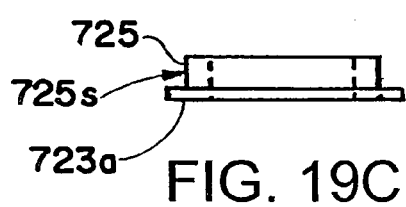
FIG. 19C is a schematic side elevation view of the mounting ring and circular ring contact for the system of FIG. 17.
Figure 19D:
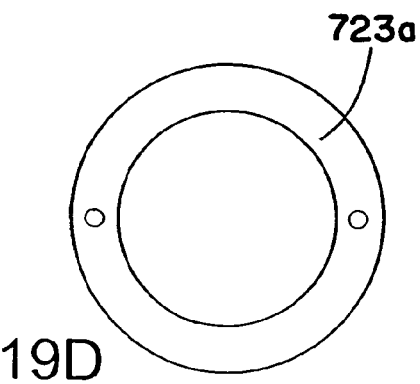
FIGS. 19D and 19E are, respectively, top plan and side elevation views of circular ring contact for the system of FIG. 17.
Figure 19E:
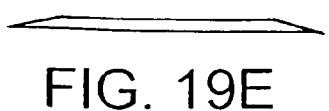
Figure 22:
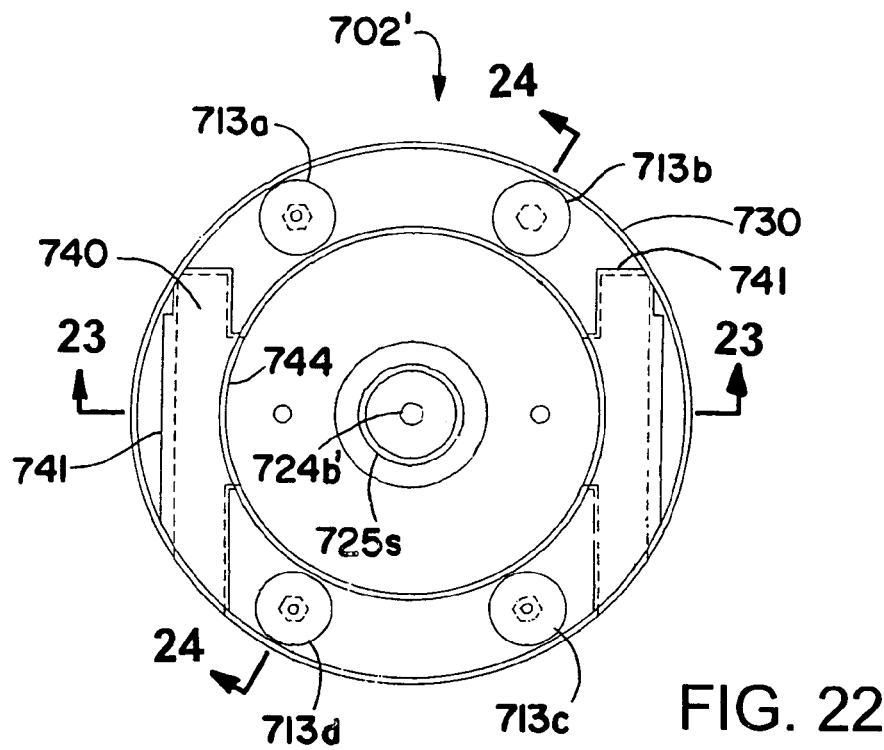
FIG. 22 is a top plan view of another embodiment of mount.

The first of the two coupling systems that holds the mount 702 to the base member 701 is the magnetic coupling system 711. The magnets 713 thereof provide force to hold the mount 702 to the base member 701 during installation and removal of the mount 702. There are three magnets mounted in the cover 730, as is shown in FIGS. 17, 18, and 20, to provide holding force sufficient to keep the mount 702 and any attached or integral device 704 secured to the base member 701. More or fewer magnets may be used to achieve application specific results (e.g. to increase the holding force by increasing the number of magnets, to distribute the places where magnetic force is used, to allow use of fewer or more magnets of larger or smaller magnetic strength, etc.). The magnets 713 may be bonded by adhesive or other means to the magnet stand offs 734 or they may be secured thereto using a fastener, such as a screw. A purpose of the magnetic coupling system 711 is to hold the mount 702 to the base member 701 during installation and removal of the mount. During this period the mechanical coupling system 712 is not active, since during installation and removal of the mount 702 the mechanical coupling system 712 would be selectively disengaged. The mechanical coupling system 712 is discussed in more detail below. The magnets 713 also will hold the mount 702 to the base member 701 in the event that the mechanical coupling system were unintentionally released. In an alternate embodiment of the present invention, the magnetic coupling system 711 may be replaced by another retention mechanism, such as Velcro® fasteners or a similar device. Such retention mechanisms can operate by placing parts together usually without the need to move parts, e.g. as the movement in the mechanical coupling system 712.

In addition to the magnetic coupling system 711, the invention also includes the mechanical coupling system 712. The magnetic coupling system 711 and the mechanical coupling system 712 operate in tandem and ensure that if one coupling system fails, the other coupling system will maintain the mount 702 attached to the base member 701. The mechanical coupling system 712 may take on several forms, such as a retractable clip systems shown in FIGS. 17-21, and in several other drawing figures, or a touch latch (FIGS. 33-36), or a slam latch.

A retractable clip system 740 type of mechanical coupling system 712 may be used to secure the mount 702 to the base member 701. In the retractable clip system 740, the clip 715 is integral to the mount 702 and interfaces with the retention member 716 of the base member 701. Referring now to FIGS. 17, 18, 20, and 21, the clip system 740 can be viewed in more detail. The clip 715 resides within a clip holder 741. The clip 715 may be metallic, plastic or any suitable material that provides strength and flexibility. The clip 715 has a male portion 742 that is supported from a resilient spring like support 743 in the clip holder 741; the male portion 742 is effectively spring loaded within the clip holder 741 and tends to extend out of the clip holder 741 at a clip slot 744. The clip male portion 742 engages the retention member 716 of the base member 701 and can be retracted by the insertion of the decoupling arms 717 of the installation and removal tool 703. The tool will be discussed in more detail later.

The clip holder 741 includes a tool guide slot 750 that accepts the decoupling arms 717 of the installation and removal tool. The tool guide slot 750 is shown in the drawings as being circular in shape, but it may be any geometric configuration e.g. to cooperate with the arms 717 and the clip. The shape of the tool guide slot 750 may be keyed to the shape of the arms 717, e.g. square, circular, hexagonal, or an unusual cross-section shape, so that only arms 717 of the prescribed cross-sectional shape would be able to fit into the tool guide slot and/or to release the mechanical coupling system 712. This keying can provide a measure of security to avoid removal of the mount 702 from the base member 701 by an unauthorized individual.

The tool guide slot 750 provides a path along the surface of the clip 715 such that the arms 717 are inserted, the arms push the clip 715 inside the clip holder 741, thus disengaging the male portion 742 of the clip from the retention member 716. After the mechanical coupling is disengaged, force may be applied to the mount 702 using the installation and removal tool 703 to break the magnetic bond and thus to remove the mount 702 from the base member 701. It follows that the reverse procedure may be implemented to install the mount 702 to the base member 701. The clip holder 741 also includes a locking pin guide 752, which houses a locking pin 753. The locking pin is discussed in more detail below.

Referring to FIGS. 17 and 18, the installation and removal tool 703 includes a base 718a, which has an attachment slot 718b or socket that allows an elongated member such as pole 720 to be inserted into the base. The attachment slot 718b is shown in the drawings as being circular in shape, but it is not limited to such implementations. Insertion and use of a pole 720 allows the installation and removal tool 703 it to be extended into areas not normally accessible to install and/or remove the mount 702 relative to a base member 701, e.g. without the assistance of some other height altering device, such as a step ladder. The decoupling arms 717 extend out from the base 718a and are of sufficient length to retract the retaining clips 715 as they are inserted into the guide slots 750 urging the male portion 742 of the respective clips into the clip holder 741 so as not to grab to or to lock with respect to the retention member 716 of the mount 702. Also, the decoupling arms 717, as well as the other portions of the tool 703, provide the required strength and stability to support, to manipulate, and/or to position the mount 702, including any attached device 704, and the necessary force required to disengage the magnetic coupling system. The decoupling arms 717 may have a notch 717a to provide an interlock with the locking pin 753, which is discussed below.

Referring back to FIGS. 21A-D, to ensure the mount 702 remains securely attached to the installation and removal tool 703 while the mount 702 is being installed or removed, a locking pin or clip 753 may be included within the clip holder 741 of the mount 702. The locking pin 753 includes a notch 754 and also includes a surface 754a that interfaces with a corresponding notch 717a in a decoupling arm 717 of the installation and removal tool 703. The locking pin or clip 753 is maintained in an extended position by a spring 755, and descends into the clip holder 741 by striking the base member 701 as the mount 702 and base member 701 are mated. The locking pin 753 moves perpendicularly to the tool guide slot 750, thus intersecting the decoupling arm 717 of the installation and removal tool 703 at approximately a 90 degree angle. In the retracted position, the notch 754 of the locking pin 753 aligns with the tool guide slot 750, thus providing an unobstructed path for the decoupling arms 717 to travel. However, if the locking pin 753 is extended, as would be the case when the mount 702 is not mated to the base member 701, the tool guide slot 750 is obstructed by the locking pin surface 754a, preventing an object from passing the locking pin 753. If the decoupling arms 717 are fully inserted into the tool guide slot 750, the notch 717a of the decoupling arm 717 lines up with the locking pin 753. If the locking pin is in the extended position, the locking pin surface 754a interlocks with the decoupling arm notch 717a. This prevents the decoupling arm 717 from being removed from the tool guide slot 750, and the mount 701 is effectively locked to the tool 703.

It will be appreciated that although the tool 703 is shown with two decoupling arms 717, there may be only one or may be more than one, and the clip 715 and associated parts for coupling with the retention member 716 may be correspondingly modified to work in cooperation with a number of decoupling arms. The same or similar method of retaining the mount 702 on the tool 703 also could be achieved in using a clip or the like which could be depressed by any part of the member 701.

In using the system 700 of the present invention, the base member 701 is assumed to be fixed to a rigid member, such as a wall or a pole. One would place the mount 702, including the device 704 onto the installation and removal tool 703. To accomplish this, the retracting pin 753 must be manually depressed into the mount 702. Holding the retracting pins 753 against the mount 702, the decoupling arms 717 of the tool 703 are inserted into the tool guide slots 750. After the decoupling arms 717 are fully inserted into the mount 702, the locking pins 753 are released, thus locking the mount 702 to the tool 703. If not already done, the pole 720 is inserted into the mount and the locking screw 719b is tightened to clamp the pole 720 securely into socket 718b. Using the pole, the assembly is placed against the base member 701. The magnetic coupling system 711 provides holding force to keep the mount 702 attached to the base member 701. As the mount 702 is coupled to the base member 701, the locking pins 753 are pressed into the mount, aligning the notch 754 of the locking pin 753 with the tool guide slot 750. This provides an unobstructed path in the tool guide slot 750 for the decoupling arms 717 to pass through, thus allowing the decoupling arms 717 to be retracted from the mount 702. After the decoupling arms 717 are removed from the mount, the clip 740 extends out of the clip slot 744 and engages the retention member 716 of the base member, thus locking the base member 701 and mount 702 together.

To remove the mount 702 and device 704 from the base member 701, the tool 703 is positioned towards the mount 701. The decoupling arms 717 are inserted into the tool guide slots 750, thus urging the clip 740 back into the clip holder 741 and unlocking the mount 702 from the base member 701. The magnetic coupling system 711 is now holding the base member 701 and mount 702 together. Using the pole 720, force is applied to the mount 702 to break the magnetic bond between the base member 701 and the mount 702. As the mount 702 is separated from the base member 701, the locking pins 753 are extended, placing surface 754a of the locking pin 753 in the tool guide slot 750. Notches 717a of the decoupling arms interlock with the surface 754a to prevent movement of the decoupling arms 717, thus locking the mount to the tool 703. The mount may now be safely lowered to ground level.

Briefly referring to FIGS. 22-27, another embodiment of mount 702' is illustrated. The difference between the mount 702' and the mount 702 is that the mount 702' includes four magnets 713. As is seen in FIGS. 22-27, the four magnets 713 are positioned on respective supports of the cover 730; and the magnets are distributed about the circular shape of the cover 730. Although the magnets are not all equally spaced about the circumference of the cover 730, they are distributed so as to provide suitable holding function as was described above.

Figure 23:
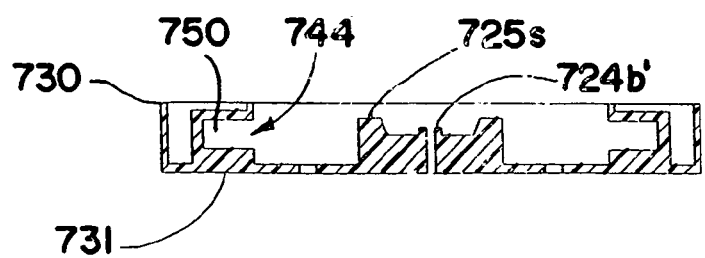
FIG. 23 is a section view of the mount looking generally in the direction of the arrows 23-23 of FIG. 22.
Figure 24:
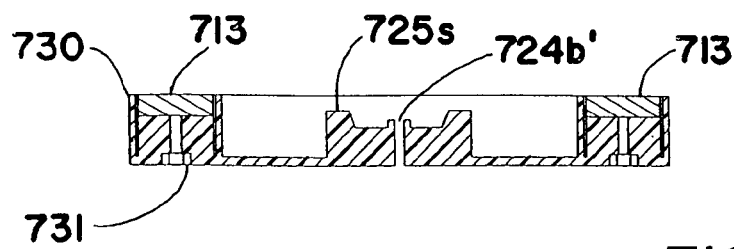
FIG. 24 is a section view of the mount looking generally in the direction of the arrows 24-24 of FIG. 22.
Figure 25:
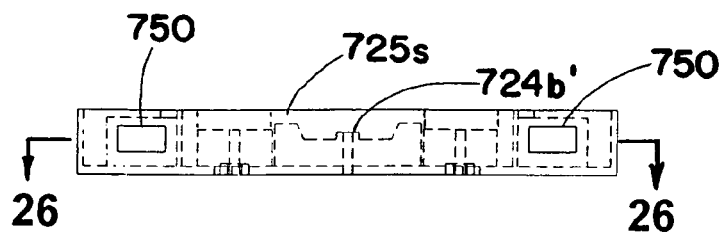
FIG. 25 is a side elevation view of the mount of FIG. 22.
Figure 26:
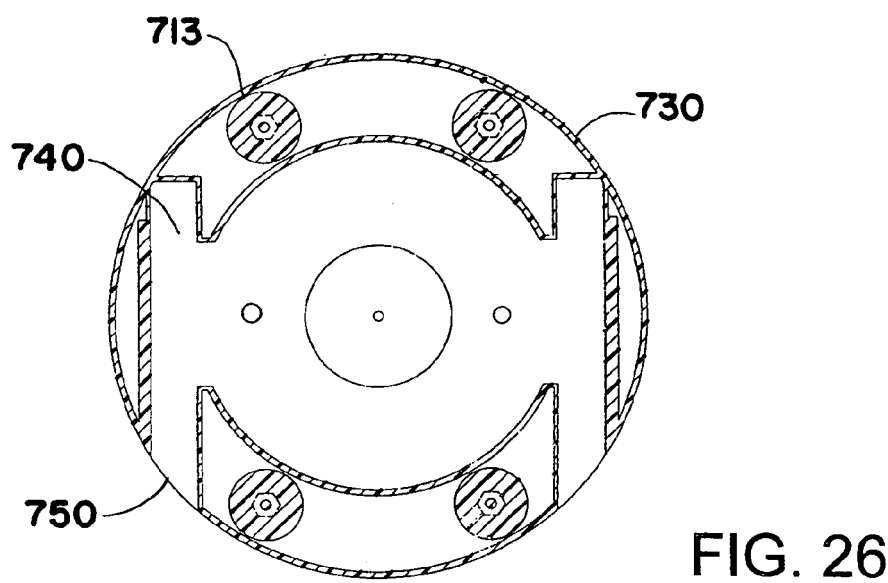
FIG. 26 is a top section view of the mount looking generally in the direction of the arrows 26-26 of FIG. 25.
Figure 27:
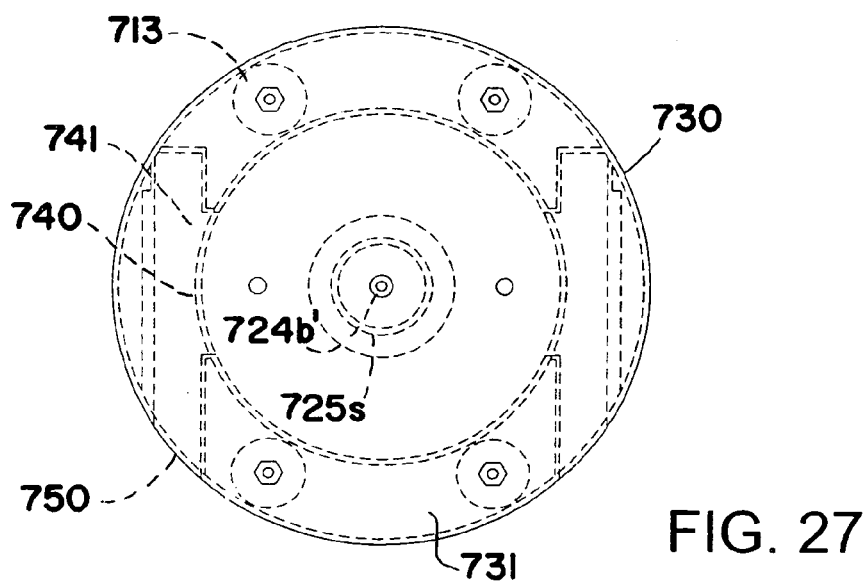
FIG. 27 is a bottom view of the mount looking up at the outside thereof with no device mounted thereon.

The mount 702' is shown in FIGS. 22-27 with the clip 715 omitted so the shape and arrangement of the clip slot 744, clip holder 741 and tool guide slot 750 clearly can be seen. Also, the circular ring contact 723b and fixed terminal 724b are not illustrated in FIGS. 22-27 so the shape and arrangement of the support surface 725s for the ring contact and the support 724b' for the fixed terminal clearly can be seen. In FIGS. 23 and 24 section views are illustrated; and from those views it can be seen that various portions of the mount 702' can be molded or otherwise formed of a single integral material, e.g., plastic, metal or other material.

Turning, now, to FIGS. 28-32, illustrated are several alternate embodiments of dual retention mechanisms for the various embodiments of systems 700 etc. disclosed herein. The dual retention system illustrated in FIGS. 28-32 include a magnetic retention mechanism of the various types described above, or some other retention mechanism that works based on contact or proximity, e.g., as VELCRO® fasteners, magnets or the like. Additionally, the dual retention system of FIGS. 28-32 includes a latching mechanism similar to that illustrated in and described with respect to the latching mechanism 510 of FIG. 15.

Figure 28:
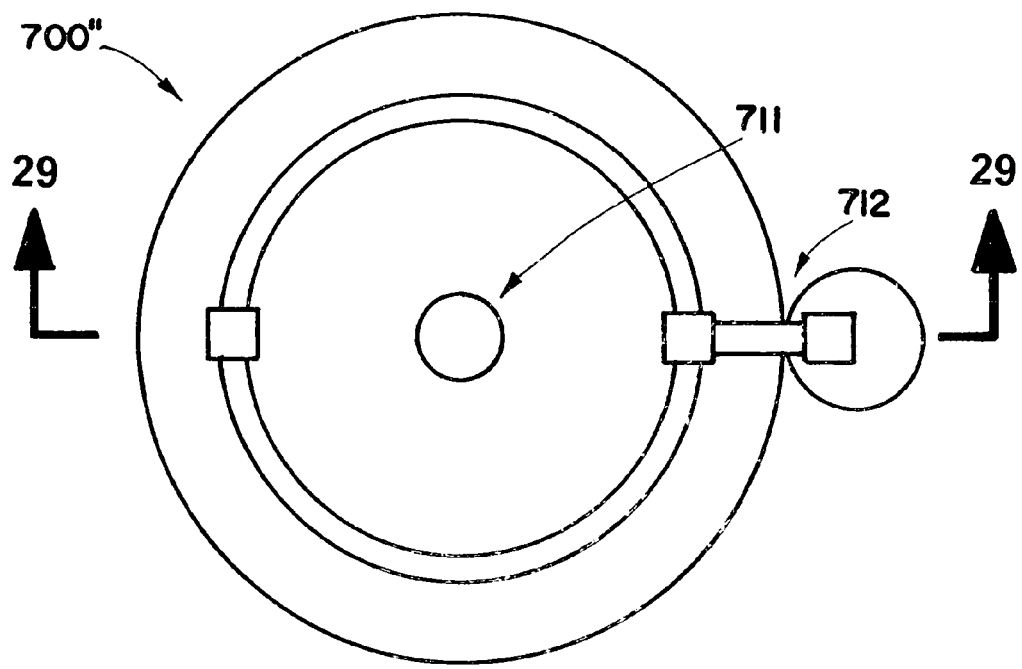
FIG. 28 is a schematic partial top plan view of another embodiment of mount having a dual retention system that includes a mechanical latch.
Figure 29:
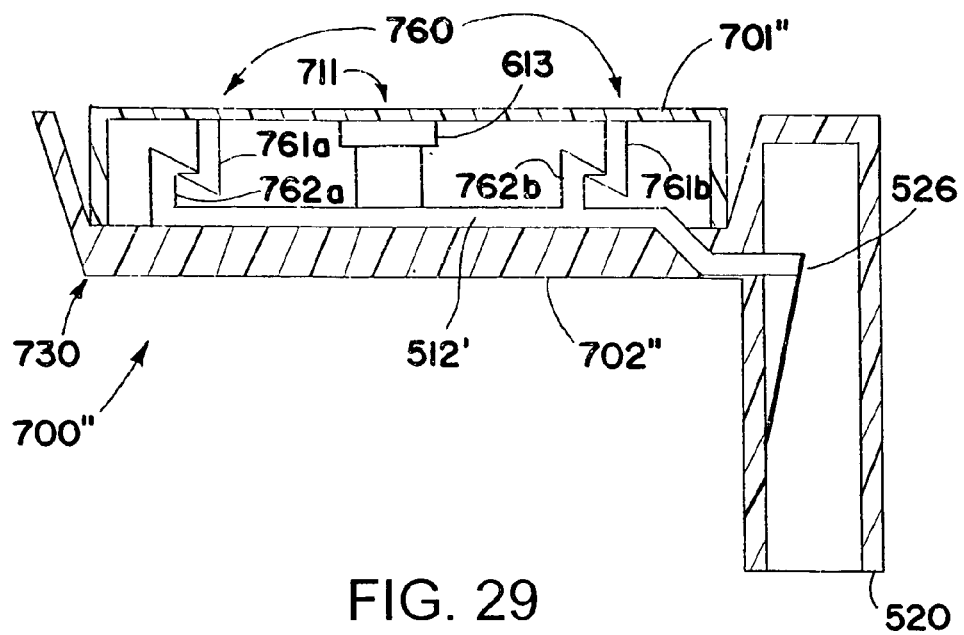
FIG. 29 is a schematic partial section view of embodiment of a remotely attachable and separable coupling system with a mechanical latch of the type illustrated in FIG. 28.

As is seen in FIGS. 28 and 29, the system 700" has a base member 701", mount 702", magnetic retention mechanism 711, and mechanical retention mechanism 760. The mechanical retention mechanism includes two pairs of catch members 761a, 761b and 762a, 762b. The catch members 762 are mounted on a movable latch arm 512' so as to be movable to and fro relative to the catch members 761a, 761b. The latch arm 512' is movable, e.g., slidable along and parallel to the bottom wall of the cover 730' of the mount 702". The latch arm 512a has semicircular portions that allow space for a centrally located magnet 613 of the magnetic retention mechanism. If desired, the magnets may be about an outer perimeter area of the cover 730' leaving the central area of the cover of the mount 702" available for electrical terminals, contacts and the like as was described above.

A spring-biased lever arm 526 urges the latch arm 512' to the right relative to the illustration of FIGS. 28 and 29, to tend to move the catch members 762 to latch or to be in locking engagement with respective catch members 761a, 761b. As was described above with respect to FIGS. 15, inserting of a pole (rod, or the like) 720, for example, into the socket 520 urges the lever arm 526 and the latch arm 512' to the left to unlatch or to unlock the respective pairs of catch members and/or to move the catch members 762 out of position relative to catch members 761 for installation of the mount to the base member without the catch members interfering with each other until the pole is removed. With the pole 720 inserted in the socket 520, the mount can be installed on the base member; the mount would be retained to the base member by the magnet retention mechanism; and the pole then could be removed from the socket to allow the mechanical retention mechanism of the described catches to hold the mount and base member.

Figure 30:
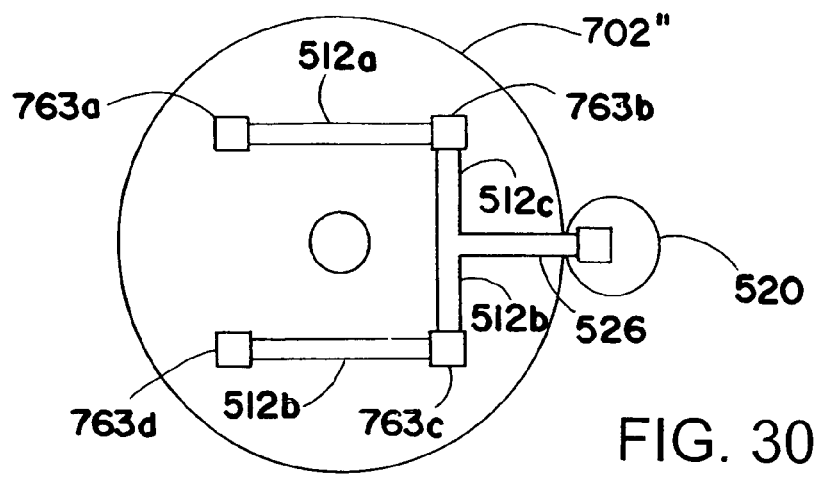
FIG. 30 is a schematic partial top plan view of another embodiment sliding latch mechanism.
Figure 31:
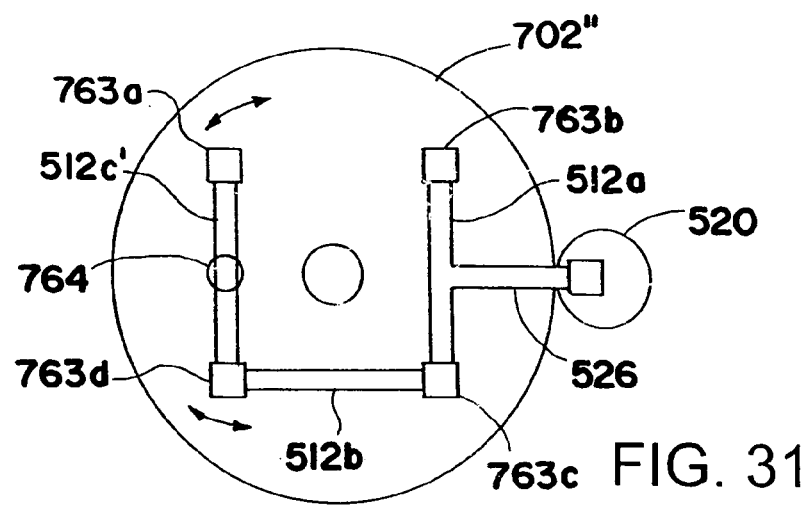
FIG. 31 is a schematic partial top plan view of still another embodiment of sliding latch mechanism with a pivot movement for reversing direction of one of the detent members of the latch mechanism.
Figure 32:
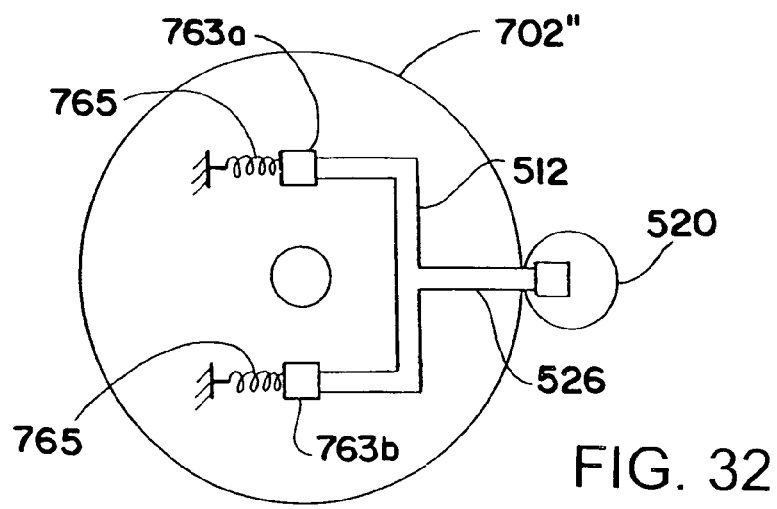
FIG. 32 is a schematic partial top plan view of even another embodiment of sliding latch mechanism with spring return.

In FIGS. 30-32 alternate arrangements of latch arms and catches generally of the type illustrated in FIGS. 28 and 29 are illustrated. The views illustrated in FIGS. 30-32 are "looking down" into the cover 730 of respective mounts 702". Respective pairs of catch members mounts analogous to catch members 761, 762 are designated 763; it will be appreciated that the catch members 762 portion of a pair 763 would be associated with the mount 702", and the catch members 761 would be in the base member 701".

In FIG. 30 there are four pairs of catch members 763a-d; and the movable latch arm includes three parts 512a, 512b, 512c coupled to support respective catch members 762 and coupled to be moved by the spring-biased lever arm 526 in the socket 520 as was described above.

In the FIG. 31 embodiment there also are four pairs of catch members 763a-d, and the movable latch arm also is in three parts 512a, 512b, 512c'. However, the movable latch arm part 512c' is pivotable about a pivot 764 so that as the movable latch arm part 512b moves to the left relative to the illustration, the catch member 762 of the pair of catch members 763c at the left end of the movable latch arm part 512b moves left while the catch member 762 of the pair of catch members 763*d* at the upper end (as illustrated) of the movable latch arm part 712*c'* moves to the right. In this case, the orientation of the catch member 761 of the pair of catch members 763*d* would face in the opposite direction to the catch member 761*a* in FIG. 29. Therefore, the pairs of catch members 763*a* and 763*d* would work in opposite directions to retain the mount 702" to the base member 701", which may provide increased stability or security of retention function of the mechanical retention mechanism.

In FIG. 32 another embodiment or arrangement of catch members 763*a-b* of mechanical retention mechanism is illustrated. In this embodiment springs 765 resiliently urge the parts of the movable latch arm 512 and, thus, the catch members 763*a-b* to locked condition. However, insertion of a pole 720 into the socket 520 urges the parts of the latch arm 512 and, thus, the catch members 762 associated with the respective catch members 763*a-b* to unlocked or unlatched condition, to facilitate removal of the mount 702" from a base member 701". In this embodiment the springs 765 may supplement the spring force of the spring-biased lever arm 526 or may be the sole provider of the restoring force to locked condition; and in the latter case the spring-biased lever arm 526 may be replaced by an arm that is pivotably mounted in the socket 520.

Figure 33:
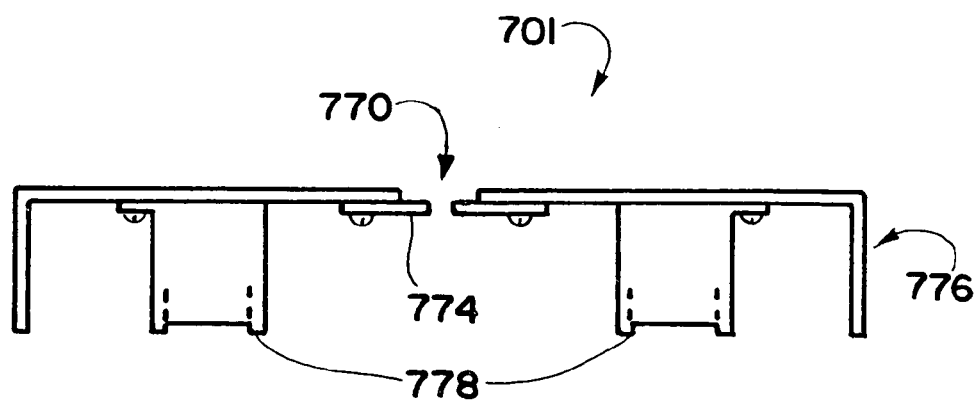
FIG. 33 is a schematic partial section view of the base member for a touch latch embodiment of the invention.
Figure 34:
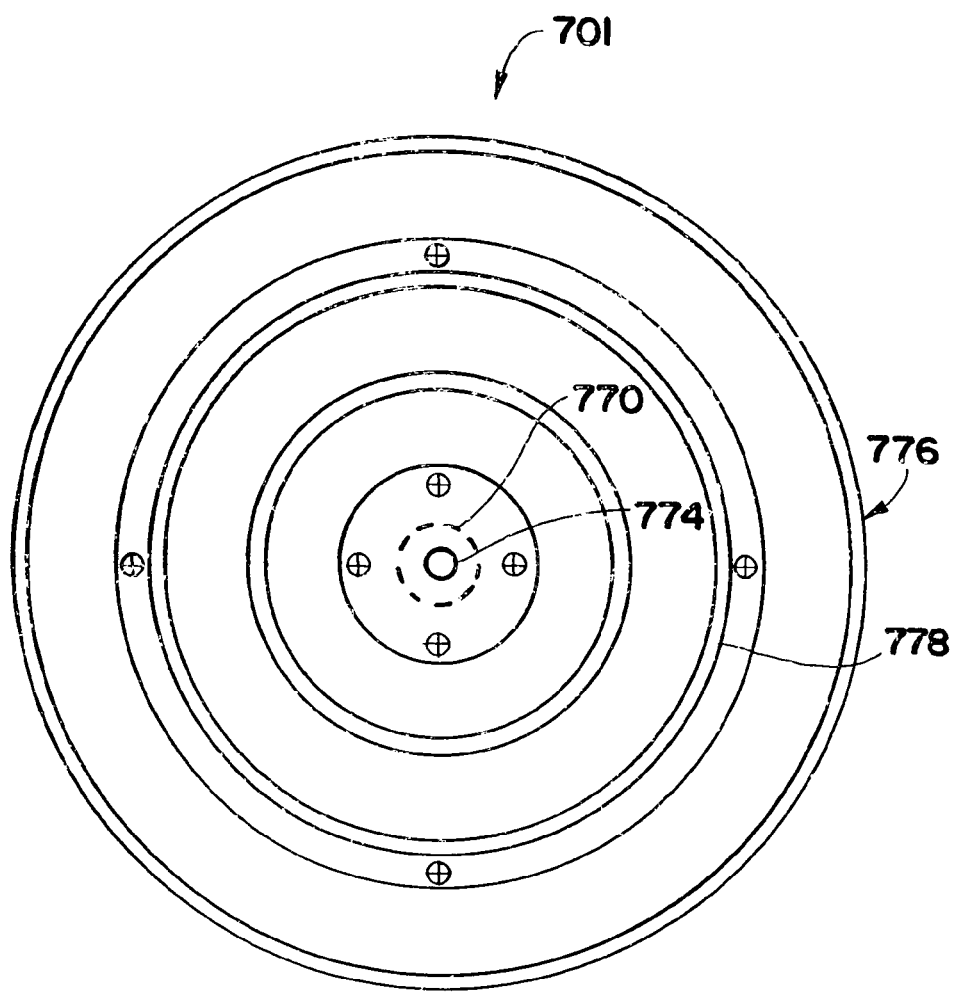
FIG. 34 is a bottom view of the base member for a touch latch embodiment of the invention.

As was noted earlier, the mechanical coupling system 712 may be implemented in several different embodiments, such as a touch latch and/or a slam latch. Referring to FIGS. 33 through 36, a touch latch implementation of the present invention is shown. The base member 701 is shown in FIGS. 33-34. A receptacle 770 is a circular hole in the base member 701 and accepts the touch latch 772. The diameter of the receptacle 770 is smaller than the diameter of the touch latch 772, thus preventing the touch latch from passing through the receptacle; e.g. it acts as a centering guide. The reinforcing plate 774 provides added strength to the receptacle 770 and is the primary latch point for the touch latch locking arm (described below). The base member 701 includes an outer wall 776, which also functions as a supplemental guide ring to facilitate mating the base member 701 and mount 702. The upper guide ring 778 further assists in guiding the travel of the mount 702 as it is depressed into the base member 701 to toggle the touch latch 772.

Figure 35:
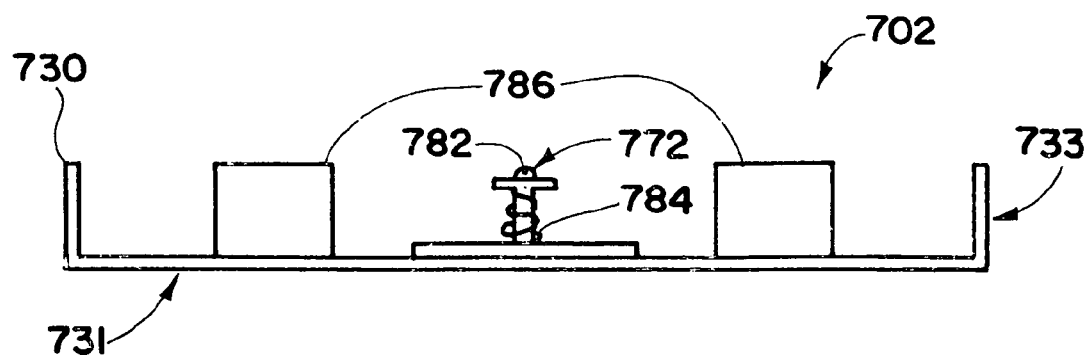
FIG. 35 is a schematic section view of the mount for a touch latch embodiment of the invention.
Figure 36:
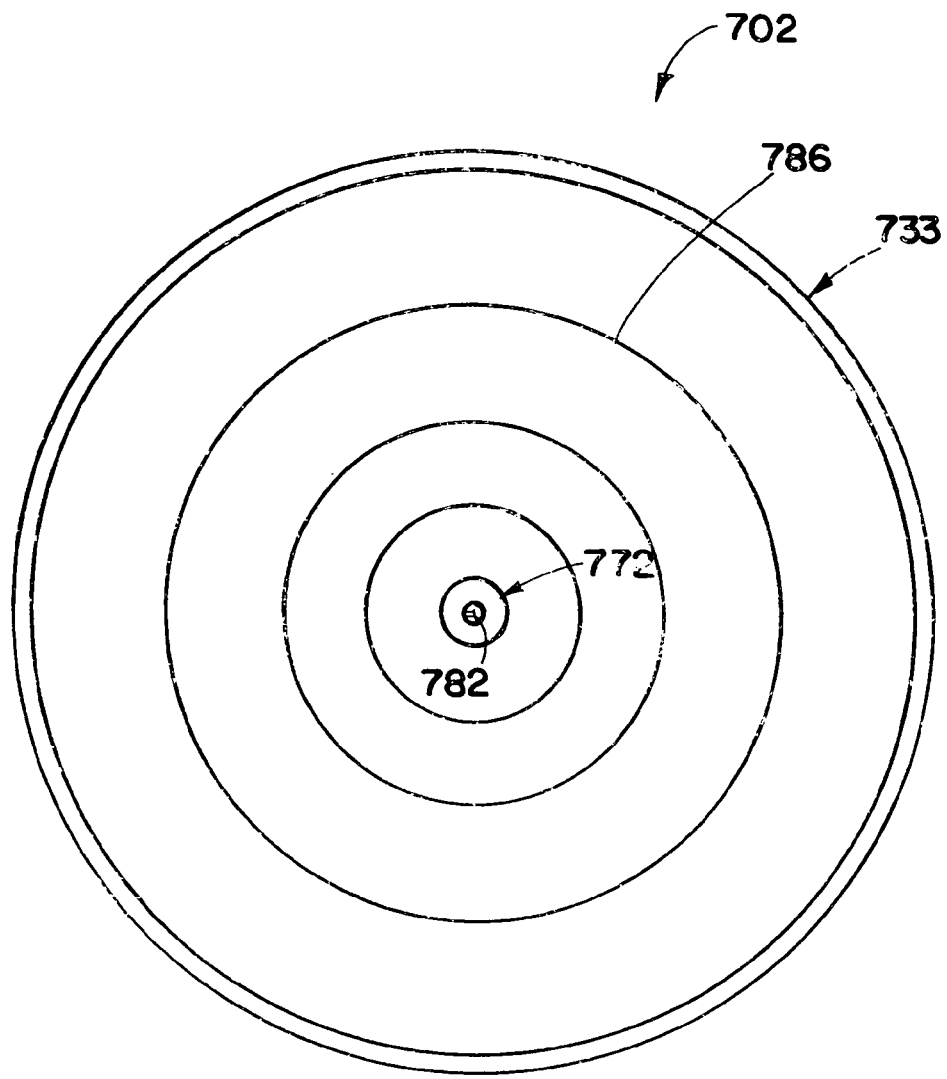
FIG. 36 is a top view of the mount for a touch latch embodiment of the invention.

Referring to FIGS. 35 and 36, the mount 702 that includes part of the touch latch system can be seen. The lower guide ring 786 interfaces with the upper guide ring 778 of the base member 701 to assist in guiding the mount 702 towards the base unit 701 as the touch latch 772 is manipulated. The touch latch 772 interfaces with the receptacle 770 of the base member 701 to lock the mount to the base member. As was noted previously, the diameter of the touch latch 772 is greater than the diameter of the receptacle 770, thus preventing the touch latch from passing through the receptacle (the upward direction, as shown, although direction is not crucial). If the locking arm 782 is extended, the latch cannot be pulled out of the reinforcing plate 774 in which the receptacle 770 is located (the downward direction). Thus, if the locking arm 782 is extended, the touch latch can neither be moved "upward" or "downward". The touch latch is locked in position. The touch latch 772 changes state (locked or unlocked) each time the latch is depressed. For example, starting in the locked state, if the mount 702 is pressed toward the base member 701, the latch toggles retracting the locking arm. Since the retracting arm 782 is no longer preventing the "downward" motion, the mount 702 may be removed. Conversely, mating the mount 702 to the base member 701 and pressing the two together toggles the state of the latch again, thus extending the locking arm 782 and locking the mount 702 back to the base member 701. A spring 784 provides a force to return the touch latch to an extended position each time the latch is depressed.

A slam latch is analogous to a door latch in that disengaging the latch requires some external force, such as a twisting of a door knob or depressing a release button. Locking the latch requires merely pressing the latch against its mating member.

I claim:

1. A fixture mounting structure, comprising:
   a base mountable securely to a support;
   a cover attachable to the base;
   a magnetic device to support the cover from the base to hold the cover and base together; and
   a selectively operable mechanical retainer to provide retention of the cover to the base, wherein the selectively operable mechanical retainer is cooperatively related to the base and cover to hold together the base and cover in an event that the magnetic device intentionally or unintentionally releases, and the selectively operable mechanical retainer comprises a clip and a retention member, said clip being mounted to the cover and said retention member being mounted to the base, wherein the clip is housed within a clip holder, said clip being retractable within the clip holder by the application of a retracting tool.

2. A fixture mounting structure, comprising:
   a base mountable securely to a support;
   a cover attachable to the base;
   a magnetic device to hold the cover and base together; and
   a selectively operable mechanical retainer to provide retention of the cover to the base, wherein the selectively operable mechanical retainer is cooperatively related to the base and cover to hold together the base and cover in an event that the magnetic device intentionally or unintentionally releases, and the selectively operable mechanical retainer comprises a clip and a retention member, said clip being mounted to the cover and said retention member being mounted to the base, wherein the clip is housed within a clip holder, said clip being retractable within the clip holder by the application of a retracting tool,
   wherein the retention member is a retaining ring.

3. The fixture mounting structure of claim 2, wherein the retaining ring is grooved along it's the retaining ring's outer edge.

4. The fixture mounting structure of claim 3, further comprising a battery operated light fixture.

5. The fixture mounting structure of claim 3, further comprising a smoke detector.

6. A fixture mounting structure, comprising:
   a base mountable securely to a support;
   a cover attachable to the base;
   a magnetic device to support the cover from the base to hold the cover and base together; and
   a selectively operable mechanical retainer to provide retention of the cover to the base, wherein the selectively operable mechanical retainer comprises a clip and a retention member, said clip being mounted to the cover and said retention member being mounted to the base.

7. The fixture mounting structure of claim 6, wherein the clip is housed within a clip holder, said clip being retractable within the clip holder by an application of a retracting tool.

8. A fixture mounting structure, comprising:
   a base mountable securely to a support;
   a cover attachable to the base;

a magnetic device to support the cover from the base to hold the cover and base together; and a selectively operable mechanical retainer to provide retention of the cover to the base, and the base further includes an electrical connection with respect to the cover.

9. The fixture mounting structure of claim 8, wherein the electrical connection provides for a signal coupling between the cover and the base.

10. The fixture mounting structure of claim 8, wherein the cover further comprises a means to couple electrical power from the base to the cover.

11. A fixture mounting structure, comprising:
a base mountable securely to a support;
a cover attachable to the base;
a magnetic device to hold the cover and base together; and
a selectively operable mechanical retainer to provide retention of the cover to the base, and the base further includes an electrical connection with respect to the cover,
wherein the cover further comprises a means to couple electrical power from the base to the cover, and
wherein the means for coupling the electrical power from the base to the cover comprises a fixed terminal and a conductive ring.

12. The fixture mounting structure of claim 11, further comprising a light fixture.

13. The fixture mounting structure of claim 11, further comprising a smoke detector.

14. A fixture mounting structure, comprising:
a base mountable securely to a support;
a cover attachable to the base;
a magnetic device to support the cover from the base to hold the cover and base together; and
a selectively operable mechanical retainer to provide retention of the cover to the base, further comprising a tool positionable with respect to the mechanical retainer to operate the mechanical retainer to uncouple the base from the cover.

15. The fixture mounting structure of claim 14, further comprising an elongated member to apply force to uncouple the magnetic device.

16. The fixture mounting structure of claim 15, wherein the elongated member is a pole.

17. A fixture mounting structure, comprising:
a base mountable securely to a support;
a cover attachable to the base;
a magnetic device to support the cover from the base to hold the cover and base together; and
a selectively operable mechanical retainer to provide retention of the cover to the base, wherein the base further comprises a receiving slot, and a reinforcing plate which includes a means to accept a latching device and the selectively operable mechanical retainer is a latch.

18. A mounting system, comprising:
a base attachable to a support;
a mounting member selectively attachable to the base and removable from the base;
a multi-retention mechanism to hold the base and the mounting member together, including
at least one mechanical attachment that is selectively operable to release and hold and operates using a positive lock, and
a second attachment that is selectively operable to release and hold and operates responsive to a positional relationship, wherein the second attachment includes a magnet and magnetically responsive plate that are cooperative to support the mounting member from the base.

19. The mounting system of claim 18, wherein a smoke detector is attached to the mounting member.

20. The mounting system of claim 19, wherein the smoke detector is battery powered.

21. The mounting system of claim 19, wherein the smoke detector is externally powered.

22. The mounting system of claim 18, wherein a light fixture is attached to the mounting member.

23. The mounting system of claim 22, wherein the light fixture is battery powered.

24. The mounting system of claim 22, wherein the light fixture is externally powered.

25. A method of removing a suspended subassembly that is releasably coupled to a relatively remote secured subassembly by a dual retention mechanism that includes a first holding mechanism, which includes a mechanical retainer to provide retention of the suspended subassembly from the secured subassembly, and a second holding mechanism, which operates based on a positional relationship to support the suspended subassembly from the secured subassembly, comprising the steps of:
coupling a tool to the suspended subassembly to release the first holding mechanism;
applying a force to the tool to release the second holding mechanism that supports the suspended subassembly from the secured subassembly; and
withdrawing the suspended subassembly.

26. A method of releasably coupling a suspended subassembly to a relatively remote secured subassembly by a dual retention mechanism that includes a first holding mechanism, which includes a mechanical retainer to provide retention of the suspended subassembly from the secured subassembly, and a second holding mechanism, which operates based on a positional relationship to support the suspended subassembly from the secured subassembly, comprising the steps of:
coupling a tool to the suspended subassembly to release the first holding mechanism from a retention condition;
using the tool to register the suspended subassembly to the secured subassembly, thereby engaging the second holding mechanism that supports the suspended subassembly from the secured subassembly; and
uncoupling the tool from the suspended subassembly, thereby engaging the first holding mechanism to a retention condition to retain the suspended subassembly from the secured subassembly.

27. A method of decoupling with respect to a support, wherein
a fixture mounting structure includes a base mounted to a support, and a cover that is attachable to the base, a magnetic device to support the cover from the base to hold the cover and base together; and a selectively operable mechanical retainer to provide retention of the cover to the base, comprising
positioning a tool with respect to the mechanical retainer to operate the the mechanical retainer to release retention of the cover to the base by the selectively operable mechanical retainer while the magnetic device supports the cover from the base.

28. A method of mounting with respect to a support, wherein
a fixture mounting structure includes a base mounted to such support, a cover attachable to the base, a magnetic device to support the cover from the base to hold the cover and base together; and a selectively operable mechanical retainer to provide retention of the cover to the base, comprising positioning a tool with respect to the cover to operate the mechanical retainer to a deactivated condition, using the tool placing the cover with respect to the base in relation for the magnetic device to support the cover from the base, and while the magnetic device supports the cover from the base, removing the tool from the cover to permit the mechanical retainer to effect retention of the cover to the base.

29. The method of claim 28, further comprising manipulating the tool to remove the cover from the base.

* * * * *

UNITED STATES PATENT AND TRADEMARK OFFICE
CERTIFICATE OF CORRECTION

| | | |
|---|---|---|
| PATENT NO. | : 7,287,738 B2 | Page 1 of 1 |
| APPLICATION NO. | : 10/007509 | |
| DATED | : October 30, 2007 | |
| INVENTOR(S) | : Pitlor | |

It is certified that error appears in the above-identified patent and that said Letters Patent is hereby corrected as shown below:

Column 12, line 36, delete "20".

Signed and Sealed this

First Day of April, 2008

JON W. DUDAS
*Director of the United States Patent and Trademark Office*